United States Patent
Jha et al.

(10) Patent No.: US 10,764,957 B2
(45) Date of Patent: Sep. 1, 2020

(54) METHOD AND UE FOR OPTIMIZING RESOURCES OF WIRELESS COMMUNICATION NETWORK WHILE PROVIDING 5G SERVICES

(71) Applicant: Samsung Electronics Co., Ltd., Gyeonggi-do (KR)

(72) Inventors: Kailash Kumar Jha, Bangalore (IN); Mudit Goel, Bangalore (IN); Alok Kumar Jangid, Bangalore (IN); Govind Irappa Uttur, Bangalore (IN)

(73) Assignee: Samsung Electronics Co., Ltd (KR)

(*) Notice: Subject to any disclaimer, the term of this patent is extended or adjusted under 35 U.S.C. 154(b) by 0 days.

(21) Appl. No.: 16/552,408

(22) Filed: Aug. 27, 2019

(65) Prior Publication Data

US 2020/0068647 A1 Feb. 27, 2020

(30) Foreign Application Priority Data

Aug. 27, 2018 (IN) .................. 201841031985 PS
Aug. 20, 2019 (IN) .................. 201841031985 CS

(51) Int. Cl.
*H04W 36/32* (2009.01)
*H04W 36/14* (2009.01)
(Continued)

(52) U.S. Cl.
CPC ......... *H04W 76/27* (2018.02); *H04W 60/005* (2013.01); *H04W 76/15* (2018.02)

(58) Field of Classification Search
CPC ............. H04W 36/0022; H04W 48/16; H04W 60/005; H04W 76/36; H04W 50/005; H04W 76/16; H04W 36/32; H04W 36/14
(Continued)

(56) References Cited

U.S. PATENT DOCUMENTS 9,439,121 B2 * 9/2016 Barreto De Miranda Sargento .... H04W 36/14
9,445,385 B2 * 9/2016 Nayak ................. H04W 60/005
(Continued)

FOREIGN PATENT DOCUMENTS

KR 1020180081830 7/2018
WO WO 2018/124955 7/2018

OTHER PUBLICATIONS

Qualcomm Incorporated, "Voice over NR Feature Planning", R3-181091, 3GPP TSG-RAN WG3 #99, Feb. 26-Mar. 2, 2018, 3 pages.
(Continued)

*Primary Examiner* — William D Cumming
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Embodiments herein provide a method and UE for optimizing resources of wireless communication network while providing 5G services.

20 Claims, 30 Drawing Sheets

(51) Int. Cl.
*H04W 76/16* (2018.01)
*H04W 76/27* (2018.01)
*H04W 76/15* (2018.01)
*H04W 60/00* (2009.01)

(58) Field of Classification Search
USPC ....................................... 455/435.3; 370/332
See application file for complete search history.

(56) References Cited

U.S. PATENT DOCUMENTS

| | | | |
|---|---|---|---|
| 10,477,426 B1* | 11/2019 | Tiwari | H04L 43/0876 |
| 2015/0245309 A1* | 8/2015 | Nayak | H04W 8/183 |
| | | | 455/435.3 |
| 2016/0142998 A1 | 5/2016 | Tsai et al. | |
| 2016/0150451 A1* | 5/2016 | Barreto De Miranda Sargento | .... |
| | | | H04W 36/32 |
| | | | 370/332 |
| 2017/0135147 A1* | 5/2017 | Belghoul | H04W 76/36 |
| 2017/0367085 A1 | 12/2017 | Chakraborty | |
| 2018/0063774 A1* | 3/2018 | Gupta | H04B 1/3816 |
| 2018/0097585 A1 | 4/2018 | Dev et al. | |
| 2018/0109978 A1* | 4/2018 | Zhao | H04B 1/3816 |
| 2018/0332649 A1 | 11/2018 | Fan et al. | |
| 2019/0037579 A1 | 1/2019 | Yi et al. | |
| 2020/0068647 A1* | 2/2020 | Jha | H04W 76/16 |

OTHER PUBLICATIONS

International Search Report dated Dec. 4, 2019 issued in counterpart application No. PCT/KR2019/010957, 9 pages.

* cited by examiner

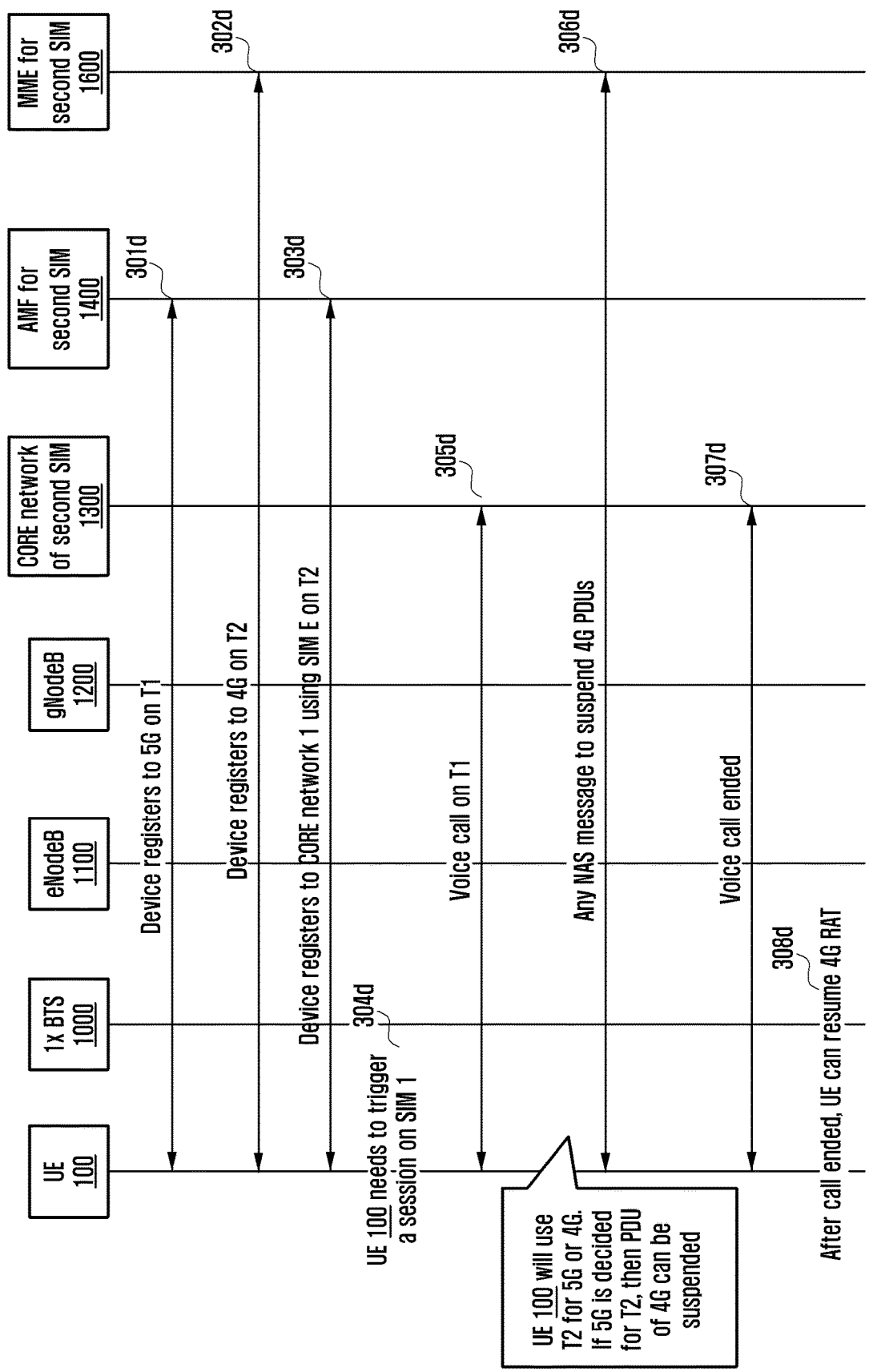

METHOD AND UE FOR OPTIMIZING RESOURCES OF WIRELESS COMMUNICATION NETWORK WHILE PROVIDING 5G SERVICES

PRIORITY

This application is based on and claims priority under 35 U.S.C. § 119 to Indian Patent Application Nos. 201841031985 (PS) and 201841031985 (CS) filed Aug. 27, 2018 and Aug. 20, 2019, respectively, the disclosures of each which are incorporated by reference herein in their entirety.

BACKGROUND

1. Field

The embodiments herein relate to wireless communication, and more particularly, to a method and a user equipment (UE) for optimizing resources of wireless communication network while providing $5^{th}$ generation (5G) services.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Currently, with the advancement in wireless communication technology, number of users accessing a wireless communication network has increased manifold times. The increased number of users of the wireless communication network has also brought in the need for optimizing resources of the wireless communication network to be able to serve the increased number of users.

Consider an example scenario where a user equipment (UE) which is dual subscriber identity module (SIM) and dual radio capable with a first transceiver being allocated to a first SIM and a second transceiver being allocated to a second SIM. When a call is initiated one the first SIM, then the second SIM is moved into an idle state with a data connectivity being suspended. However, due to the suspension of the second SIM, the second transceiver remains un-utilized which leads to loss of resources of the wireless communication network.

In another example scenario, consider the UE is dual subscriber identity module (SIM) and has a single transceiver. When the UE receives the call on the first SIM, then transceiver is allocated to the first SIM without informing the second SIM. Since, the second SIM is not aware about the call on the first SIM, the paging on the second SIM continues leading to un-necessary power consumption, which is not addressed.

The above information is presented as background information only to help the reader to understand the present invention. Applicants have made no determination and make no assertion as to whether any of the above might be applicable as prior art with regard to the present application.

SUMMARY

The principal object of the embodiments herein is to provide a method and a user equipment (UE) for optimizing resources of wireless communication network while providing $5^{th}$ generation (5G) services.

Another object of the embodiments herein is to optimize the resources of the wireless communication network by managing a registration to one of a 4G RAT and a 5G RAT based on a weighted score for the 4G RAT and the 5G RAT when an event is associated with a first SIM occupying on a first transceiver (T1).

Another object of the embodiments herein is to optimize the resources of the wireless communication network by managing the registration to one of the 4G RAT and the 5G RAT based on a plurality of parameters associated with the 4G RAT and the 5G RAT when the event is associated with the second SIM occupying on the first transceiver (T1).

Another object of the embodiments herein is to optimize the resources of the wireless communication network by suspending the 4G RAT and the 5G RAT associated with the second SIM when the event is associated with the first SIM occupying on the first transceiver (T1).

Another object of the embodiments herein is to optimize the resources of the wireless communication network by operating one of the first SIM and the second SIM in a dual registration mode when the event is associated with the first SIM.

Another object of the embodiments herein is to optimize the resources of the wireless communication network by operating the first SIM and the second SIM in a single registration mode when the event is associated with the second SIM.

Another object of the embodiments herein is to optimize the resources of the wireless communication network by suspending and resuming a downlink data when the event is associated with the first SIM.

Accordingly, the embodiments herein provide a method for optimizing resources of a wireless communication network while providing 5G services. The method includes registering, by a UE, a first SIM of the UE to a 5G Radio Access Technology (RAT) and registering, by the UE, a second SIM to at least one of the 5G RAT and a 4G Radio Access Technology (RAT). Further, the method also includes detecting, by the UE, an event associated with one of the first SIM and the second SIM and optimizing, by the UE, resources of the wireless communication network. The optimization of the resources of the wireless communication network is performed by one of managing the registration to one of the 4G RAT and the 5G RAT based on a weighted score for the 4G RAT and the 5G RAT when the event is associated with the first SIM occupying on a first transceiver (T1), managing the registration to one of the 4G RAT and the 5G RAT based on a plurality of parameters associated with the 4G RAT and the 5G RAT when the event is associated with the second SIM occupying on the first transceiver (T1), suspending the 4G RAT and the 5G RAT associated with the second SIM when the event is associated with the first SIM occupying on the first transceiver (T1), operating one of the first SIM and the second SIM in a dual registration mode when the event is associated with the first SIM, operating the first SIM and the second SIM in a single registration mode when the event is associated with the second SIM, and suspending and resuming a downlink data when the event is associated with the first SIM.

Accordingly, the embodiments herein provide user equipment (UE) for optimizing resources of a wireless communication network while providing 5G services. The UE includes a memory and a processor coupled to the memory. The processor is configured to register a first SIM of the UE to a 5G Radio Access Technology (RAT) and register a second SIM to at least one of the 5G RAT and a 4G Radio Access Technology (RAT. The processor is also configured to detect an event associated with one of the first SIM and the second SIM and optimize resources of the wireless communication network. The processor is configured to optimize the resources of the wireless communication network by one of: manage the registration to one of the 4G RAT and the 5G RAT based on a weighted score for the 4G RAT and the 5G RAT when the event is associated with the first SIM occupying on a first transceiver (T1), manage the registration to one of the 4G RAT and the 5G RAT based on a plurality of parameters associated with the 4G RAT and the 5G RAT when the event is associated with the second SIM occupying on the first transceiver (T1), suspend the 4G RAT and the 5G RAT associated with second SIM when the event is associated with the first SIM occupying on the first transceiver (T1), operate one of the first SIM and the second SIM in a dual registration mode when the event is associated with the first SIM, operate the first SIM and the second SIM in a single registration mode when the event is associated with the second SIM, and suspend and resume a downlink data when the event is associated with the first SIM.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 3F is a signaling diagram illustrating a method for selection the 5G RAT for the second SIM by the UE during the incoming call on the first SIM by suspending the 4G RAT, according to an embodiment as disclosed herein;

DETAILED DESCRIPTION

Figure 1A:
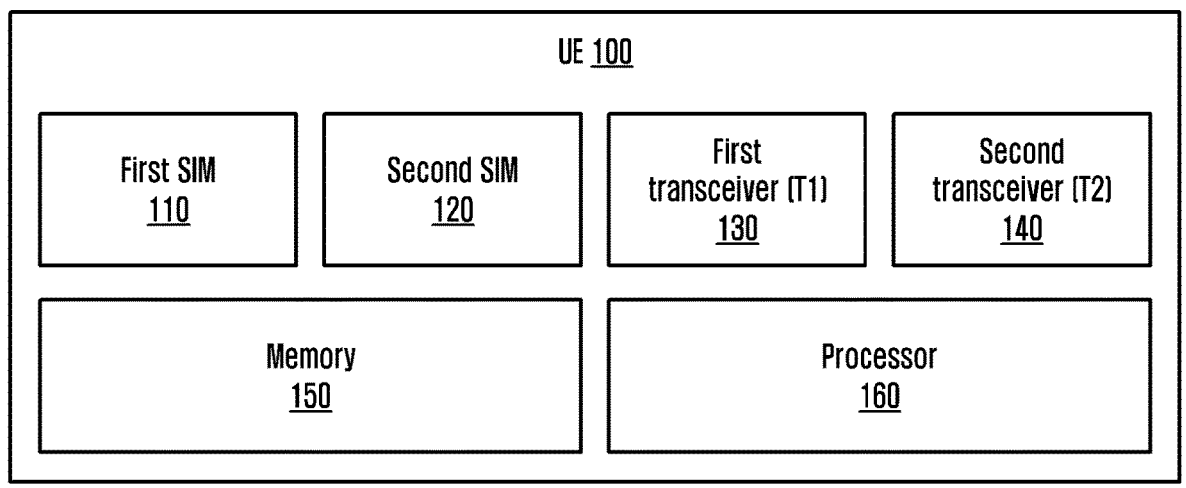
FIG. 1A is a block diagram of a UE for optimizing resources of a wireless communication network while providing 5G services, according to an embodiment as disclosed herein.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein provide a method for optimizing resources of a wireless communication network while providing 5G services. The method includes registering, by a UE, a first SIM of the UE to a 5G Radio Access Technology (RAT) and registering, by the UE, a second SIM to at least one of the 5G RAT and a 4G Radio Access Technology (RAT). Further, the method also includes detecting, by the UE, an event associated with one of the first SIM and the second SIM and optimizing, by the UE, resources of the wireless communication network. The optimization of the resources of the wireless communication network is performed by one of managing the registration to one of the 4G RAT and the 5G RAT based on a weighted score for the 4G RAT and the 5G RAT when the event is associated with the first SIM occupying on a first transceiver (T1), managing the registration to one of the 4G RAT and the 5G RAT based on a plurality of parameters associated with the 4G RAT and the 5G RAT when the event is associated with the second SIM occupying on the first transceiver (T1), suspending the 4G RAT and the 5G RAT associated with the second SIM when the event is associated with the first SIM occupying on the first transceiver (T1), operating one of the first SIM and the second SIM in a dual registration mode when the event is associated with the first SIM, operating the first SIM and the second SIM in a single registration mode when the event is associated with the second SIM, and suspending and resuming a downlink data when the event is associated with the first SIM.

In an embodiment, optimizing, by the UE, the resources of the wireless communication network by managing the registration to one of the 4G RAT and the 5G RAT based on the weighted score for the 4G RAT and the 5G RAT when the event is associated with the first SIM occupying on the first transceiver (T1) includes registering, by the UE, to a network using the first SIM on the T1 based on the event, where the UE is registered to the 4G RAT in a dual registration mode with dual radio on a first transceiver (T1) and the 5G network on the first SIM on a second transceiver (T2) and where the event is detected on the first SIM occupying the T1. The method also includes determining, by the UE, the weighted score for the 4G RAT and determining, by the UE, the weighted score for the 5G RAT. Further, the method includes optimizing, by the UE, the resources of the wireless communication network by selecting one of the 4G RAT and the 5G RAT to occupy the second transceiver (T2) when the first SIM is occupying the first transceiver (T1), based on the weighted score for the 4G RAT and the weighted score for the 5G RAT.

In an embodiment, optimizing, by the UE, the resources of the wireless communication network by selecting one of the 4G RAT and the 5G RAT to occupy the second transceiver (T2) when the first SIM is occupying the first transceiver (T1), based on the weighted score for the 4G RAT and the weighted score for the 5G RAT includes comparing the weighted score for the 4G RAT and the weighted score for the 5G RAT and performing one of selecting the 5G RAT to occupy the second transceiver (T2) in response to determining that the weighted score for the 5G RAT is greater than the weighted score for the 4G RAT, and selecting the 4G RAT to occupy the second transceiver (T2) in response to determining that the weighted score for the 4G RAT is greater than the weighted score for the 5G RAT.

In an embodiment, selecting the 5G RAT to occupy the second transceiver (T2) in response to determining that the weighted score for the 5G RAT is greater than the weighted score for the 4G RAT further includes determining, by the UE, the 5G RAT is selected to occupy the T2. The method also includes performing, by the UE, establishments of a Protocol Data Unit (PDU) session between the UE and the 5G RAT by handing over a Protocol Data Unit (PDU) from the 4G RAT to the 5G RAT and suspending the PDU session of the 4G RAT. Further, the method also includes determining, by the UE, the event on the first SIM is ended, wherein the event is a voice call; and performing, by the UE, one of handing-over the PDU back from the 5G RAT to the 4G RAT which was moved before the active session and suspending the 4G RAT.

In an embodiment, selecting the 4G RAT to occupy the second transceiver (T2) in response to determining that the weighted score for the 4G RAT is greater than the weighted score for the 5G RAT further includes determining, by the UE, the 4G RAT is selected to occupy the T2 and performing, by the UE, establishment of a Protocol Data Unit (PDU) session between the UE and the 4G RAT by handing over a Protocol Data Unit (PDU) from the 5G RAT to the 4G RAT and suspending the PDU session of the 5G RAT. The method also includes determining, by the UE, the event on the first SIM is ended, wherein the event is a voice call; and performing, by the UE, one of handing-over the PDU back from the 4G RAT to the 5G RAT which was moved before the active session and suspending the 5G RAT.

In an embodiment, the weighted score for the 4G RAT and 5G RAT is determined based on a plurality of parameters, and wherein the plurality of parameters are at least one of voice availability for paging, the T2 Radio frequency (RF) chain availability during a voice call on the T1, a Radio Access Technology (RAT) interference, transmission power level, coverage of the 4G RAT, coverage of the 5G RAT, a user subscription, a home area, a roaming area, active protocol data unit (PDU) preference, quality of service (QOS) requirement, predicted data rate of the 4G RAT, predicted data rate of the 5G RAT, determined data rate of the 4G RAT and determined data rate of the 5G RAT, operator preferences and user preferences.

In an embodiment, optimizing, by the UE, the resources of the wireless communication network by managing the registration to one of the 4G RAT and the 5G RAT based on the plurality of parameters associated with the 4G RAT and the 5G RAT when the event is associated with the second SIM occupying on the first transceiver (T1) includes registering, by the UE, to a network using the first SIM on the T1 based on the event, wherein the UE is registered to the 4G RAT in a dual registration mode with dual radio on a first transceiver (T1) and the 5G network on the first SIM on a second transceiver (T2) and wherein the event is detected on the first SIM occupying the T1; and optimizing, by the UE, the resources of the wireless communication network by selecting one of the 4G RAT and the 5G RAT for the second transceiver (T2) based on at least one of the plurality of parameters associated with the 4G RAT and the 5G RAT.

In an embodiment, at least one of the plurality of parameters associated with the 4G RAT and the 5G RAT is a user preferred RAT for application data, operator preferred RAT for the application data, user location preferred RAT for the application data, the user preferred RAT based on a called number, the user preferred RAT based on a calling number, the user preferred RAT based on a signal quality.

In an embodiment, optimizing, by the UE, the resources of the wireless communication network by suspending the 4G RAT and the 5G RAT associated with the second SIM when the event is associated with the first SIM occupying on the first transceiver (T1) includes registering, by the UE, to a network using the first SIM on the T1 based on the event, wherein the UE is registered to the 4G RAT in a dual registration mode with dual radio on a first transceiver (T1) and the 5G network on the first SIM on a second transceiver (T2) and wherein the event is a voice call detected on the first SIM occupying the T1. Further, the method includes determining, by the UE, a high interference with the event on the T1; and optimizing, by the UE, the resources of the wireless communication network by suspending the PDU sessions of the 4G RAT and the 5G RAT associated with second SIM when the event is associated with the first SIM occupying on the first transceiver (T1).

In an embodiment, optimizing, by the UE, the resources of the wireless communication network by operating one of the first SIM and the second SIM in the dual registration mode when the event is associated with the first SIM includes determining, by the UE, the first SIM and the second SIM support the dual registration mode on the 5G network and determining, by the UE, whether the first SIM supports at least one of a subscription with a mobile data, a subscription with only Voice over Long-Term Evolution (VoLTE), a subscription without a Voice over New Radio (VoNR) and a subscription with critical 5G services. Further, the method includes optimizing, by the UE, the resources of the wireless communication network by operating the first SIM in the dual registration mode in response to determining that the event occurs on the first SIM, wherein the resources of the wireless communication network is at least one of a paging and power consumption and optimizing, by the UE, the resources of the wireless communication network by operating the first SIM in the single registration mode in response to determining that the event does not occur on the first SIM, wherein the resources of the wireless communication network is at least one of paging and power consumption. Furthermore, the method also includes determining, by the UE, the second SIM supports at least one of the subscription with the mobile data, the subscription with only the Voice over Long-Term Evolution (VoLTE), the subscription without the Voice over New Radio (VoNR) and the subscription with the critical 5G services. Further, optimizing, by the UE, the resources of the wireless communication network by operating the second SIM in the dual registration mode in response to determining that the event occurs on the second SIM, wherein the resources of the wireless communication network is at least one of paging and power consumption and optimizing, by the UE, the resources of the wireless communication network by operating the second SIM in the single registration mode in response to determining that the event does not occurs on the second SIM, wherein the resources of the wireless communication network is at least one of paging and power consumption.

In an embodiment, optimizing, by the UE, the resources of the wireless communication network by operating the first SIM and the second SIM in the single registration mode includes determining, by the UE, a network of the first SIM supports the dual registration mode on the 5G network includes configuring, by the UE, the first SIM to operate in the single registration mode and determining, by the UE, whether the VONR is supported on the first SIM. Further, optimizing, by the UE, the resources of the wireless communication network by operating the first SIM on the 5G RAT in response to determining that the VONR is supported on the first SIM and optimizing, by the UE, the resources of the wireless communication network by operating the first SIM on the 4G RAT in response to determining that the VONR is not supported on the first SIM. Further, the method includes determining, by the UE, a network of the second SIM supports the dual registration mode on the 5G network and configuring, by the UE, the second SIM to operate in the single registration mode, wherein the resources of the wireless communication network is at least one of paging and power consumption. The method also includes determining, by the UE, whether the VONR is supported on the second SIM and optimizing, by the UE, the resources of the wireless communication network by operating the second SIM on the 5G RAT in response to determining that the VONR is supported on the second SIM and optimizing, by the UE, the resources of the wireless communication network by operating the second SIM on the 4G RAT in response to determining that the VONR is not supported on the second SIM), wherein the resources of the wireless communication network is at least one of paging and power consumption.

In an embodiment, optimizing, by the UE, the resources of the wireless communication network by suspending and resuming the downlink data when the event is associated with the first SIM includes determining, by the UE, the downlink data is operating on the first SIM, wherein the event is the downlink data which is operating on the first SIM and suspending, by the UE, the downlink data on the first SIM by sending a registration request with a MICO only mode on the first SIM to the 5G network, wherein the MICO only mode suspends the downlink data on the first SIM;. Further, the method includes initiating, by the UE, a voice call on the second SIM of the UE and detecting, by the UE, an incoming call directed towards the first SIM. The method also includes enabling, by the UE, a dual smart SIM feature to receive the incoming call directed towards the first SIM on the second SIM and determining, by the UE, that the voice call on the second SIM has ended; and resuming, by the UE, the downlink data on the first SIM by sending a registration request with a non-MICO only mode on the first SIM to the 5G network, wherein the non-MICO only mode resumes the downlink data on the first SIM.

In an embodiment, the method also includes enabling, by the UE, a dual smart SIM feature to receive the incoming call directed towards the first SIM on the second SIM.

In an embodiment, the event associated with one of the first SIM and the second SIM is one of a voice call, a downlink data operating on the first SIM, paging operation.

Referring now to the drawings, and more particularly to FIGS. 1 through 5C, where similar reference characters denote corresponding features consistently throughout the figures, there are shown preferred embodiments and prior arts for comparison with the preferred embodiments.

FIG. 1A is a block diagram of the UE (100) for optimizing the resources of the wireless communication network while providing the 5G services, according to an embodiment as disclosed herein.

Referring to the FIG. 1A, the UE (100) can be, for example, a mobile phone, a smart phone, Personal Digital Assistant (PDA), a tablet, a wearable device, or the like. In an embodiment, the UE (100) can include a first Subscriber Identification Module (SIM) (110), a second SIM (120), a first transceiver (130), a second transceiver (140), a memory (150) and a processor (160).

In an embodiment, the first SIM (110) of the UE (100) is registered to a 5G Radio Access Technology (RAT) and the second SIM (120) is registered to at least one of the 5G RAT and a 4G Radio Access Technology (RAT).

In an embodiment, the first transceiver (T1) (130) and the second transceiver (T2) (140) are configured to communicate with various components of the 4G network and the 5G network.

In an embodiment, the memory (150) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (150) may, in some examples, be considered a non-transitory storage medium. The term "non-transitory" may indicate that the storage medium is not embodied in a carrier wave or a propagated signal. However, the term "non-transitory" should not be interpreted that the memory (150) is non-movable. In some examples, the memory (150) is configured to store larger amounts of information than the memory. In certain examples, a non-transitory storage medium may store data that can, over time, change (e.g., in Random Access Memory (RAM) or cache).

In an embodiment, the processor (160) is configured to detect an event associated with one of the first SIM (110) and the second SIM (120). Further, the [processor (160) is also configured to optimize the resources of the wireless communication network by one of: managing the registration to one of the 4G RAT and the 5G RAT based on a weighted score for the 4G RAT and the 5G RAT when the event is associated with the first SIM (110) occupying on the T1 (130), managing the registration to one of the 4G RAT and the 5G RAT based on a plurality of parameters associated with the 4G RAT and the 5G RAT when the event is associated with the second SIM (120) occupying on the T1 (130), suspending the 4G RAT and the 5G RAT associated with the second SIM (120) when the event is associated with the first SIM (110) occupying on the T1 (130), operating one of the first SIM (110) and the second SIM (120) in a dual registration mode when the event is associated with the first SIM (110), operating the first SIM (110) and the second SIM (120) in a single registration mode when the event is associated with the second SIM (120), and suspending and resuming a downlink data when the event is associated with the first SIM (110). Although the FIG. 1A shows the hardware elements of the UE (100) but it is to be understood that other embodiments are not limited thereon. In other embodiments, the UE (100) may include less or more number of elements. Further, the labels or names of the elements are used only for illustrative purpose and does not limit the scope of the invention. One or more components can be combined together to perform same or substantially similar function.

Figure 1B:
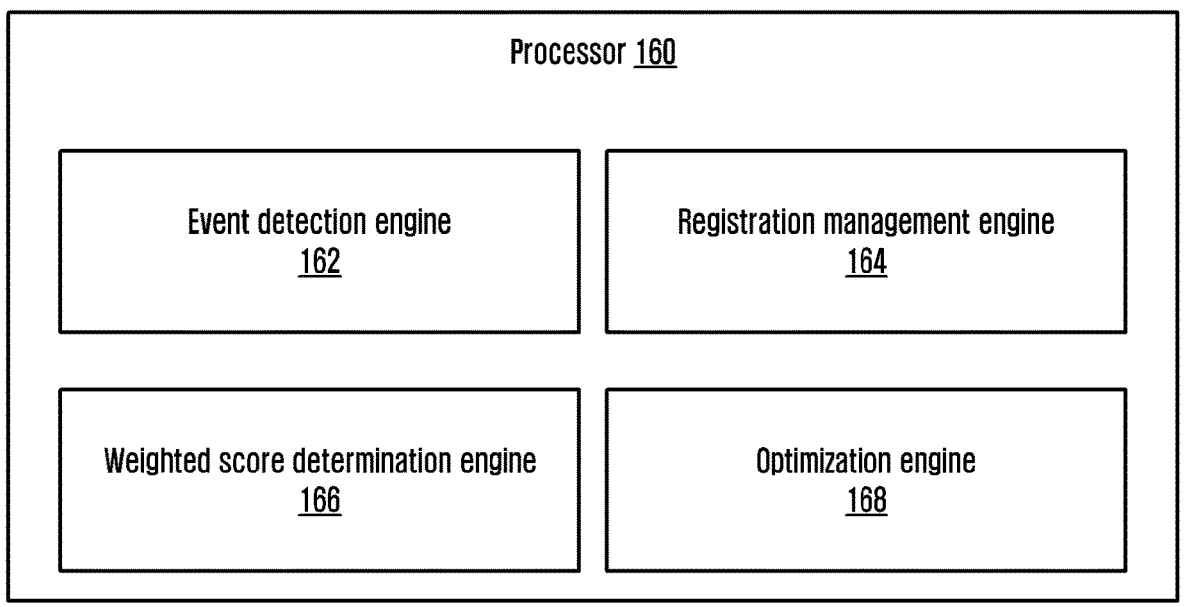
FIG. 1B is a block diagram of the processor of the UE for optimizing the resources of the wireless communication network while providing the 5G services, according to an embodiment as disclosed herein.

FIG. 1B is a block diagram of the processor (160) of the UE (100) for optimizing the resources of the wireless communication network while providing the 5G services, according to an embodiment as disclosed herein.

Referring to the FIG. 1B, the processor (160) of the UE (100) includes an event detection engine (162), a registration management engine (164), a weighted score determination engine (166) and an optimization engine (168).

In an embodiment, the event detection engine (162) is configured to detect an event associated with one of the first SIM (110) and the second SIM (120). The event associated with one of the first SIM (110) and the second SIM (120) is one of a voice call, a data call, a video call, active data session, a downlink data operating on one of the first SIM (110) and the second SIM (120).

In an embodiment, the registration management engine (164) is configured to manage the registration of the first SIM (110) and the second SIM (120) using at least one of the T1 (130) and the T2 (140). Initially, the registration management engine (164) registers the first SIM (110) of the UE (100) to the 5G Radio Access Technology (RAT) and the second SIM (120) to at least one of the 5G RAT and the 4G Radio Access Technology (RAT).

The registration management engine (164) is also configured to register the UE (100) to any network using the first SIM (110) on the T1 (130) based on the event. The registration management engine (164) is also configured to determine whether the first SIM (110) and the second SIM (120) are registered in the dual registration mode. In another embodiment, the registration management engine (164) is configured to establish a Protocol Data Unit (PDU) session between the UE and the 5G RAT.

In another embodiment, the registration management engine (164) is configured to determine whether one of the first SIM (110) and the second SIM (120) supports at least one of a subscription with a mobile data, a subscription with only Voice over Long-Term Evolution (VoLTE), a subscription without a Voice over New Radio (VoNR) and a subscription with critical 5G services.

In an embodiment, the weighted score determination engine (166) is configured to determine the weighted score for the 4G RAT and the weighted score for the 5G RAT. The weighted score is determined based on a plurality of parameters which include at least one of voice availability for paging, the T2 Radio frequency (RF) chain availability during a voice call on the T1, a Radio Access Technology (RAT) interference, transmission power level, coverage of the 4G RAT, coverage of the 5G RAT, a user subscription, a home area, a roaming area, active protocol data unit (PDU) preference, quality of service (QOS) requirement, predicted data rate of the 4G RAT, predicted data rate of the 5G RAT, determined data rate of the 4G RAT and determined data rate of the 5G RAT, operator preferences and user preferences. Further, the weighted score determination engine (166) is configured to compare the weighted score for the 4G RAT and the weighted score for the 5G RAT and determine whether the weighted score for the 4G RAT is greater than the weighted score for the 5G RAT.

In an embodiment, the optimization engine (168) is configured to optimize the resources of the wireless communication network by managing the registration to one of the 4G RAT and the 5G RAT based on the weighted score for the 4G RAT and the 5G RAT received from the weighted score determination engine (166). The optimization engine (168) selects the RAT with the higher weighted score to occupy the T2 (140) when there is an event on the first SIM (110) which is occupying the T1.

In another embodiment, the optimization engine (168) is configured to optimize the resources of the wireless communication network by managing the registration to one of the 4G RAT and the 5G RAT by selecting one of the 4G RAT and the 5G RAT for the T2 (140) based on at least one of the plurality of parameters associated with the 4G RAT and the 5G RAT. The plurality of parameters includes user preferred RAT for application data, operator preferred RAT for the application data, user location preferred RAT for the application data, the user preferred RAT based on a called number, the user preferred RAT based on a calling number, the user preferred RAT based on a signal quality.

In another embodiment, the optimization engine (168) is configured to optimize the resources of the wireless communication network by suspending the 4G RAT and the 5G RAT associated with the second SIM (120) on determining high interference with the event on the T1 (130).

In another embodiment, the optimization engine (168) is configured to optimize the resources of the wireless communication network by operating one of the first SIM (110) and the second SIM (120) in a dual registration mode when the event is associated with the first SIM (110).

In another embodiment, the optimization engine (168) is configured to optimize the resources of the wireless communication network by operating the first SIM (110) and the second SIM (120) in the single registration mode when the event is associated with the second SIM (120).

In another embodiment, the optimization engine (168) is configured to optimize the resources of the wireless communication network by suspending and resuming the downlink data when a voice call is initiated on the second SIM (120).

Figure 2A:
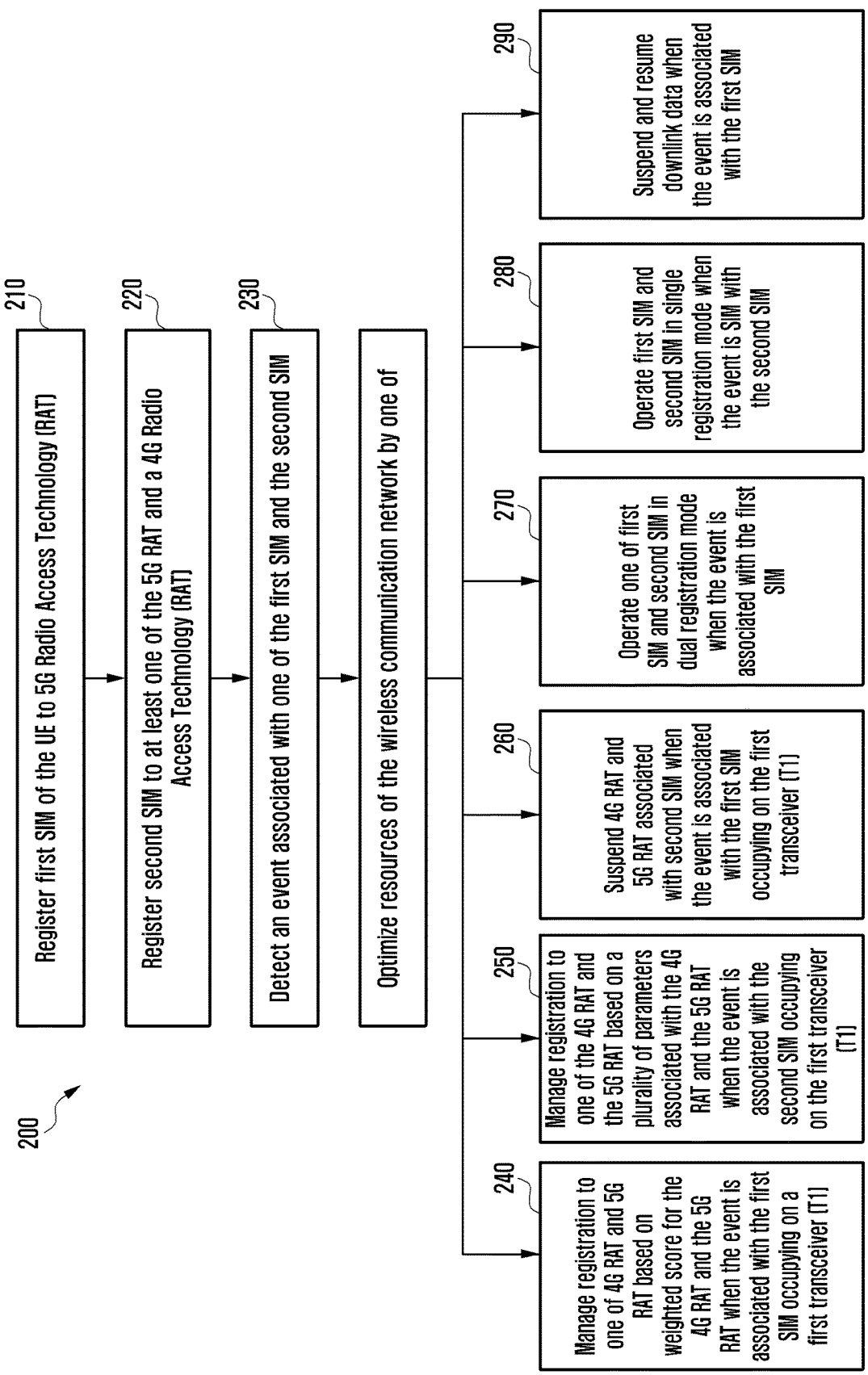
FIG. 2A is a flow chart illustrating a method for optimizing the resources of the wireless communication network while providing the 5G services, according to an embodiment as disclosed herein.

FIG. 2A is a flow chart 200 illustrating a method for optimizing the resources of the wireless communication network while providing 5G services, according to an embodiment as disclosed herein.

Referring to the FIG. 2A, in the UE (100) as illustrated in the FIG. 1A, the processor (160) is configured to perform the steps from 210 to 290.

At step 210, the UE (100) registers the first SIM (110) of the UE to the 5G Radio Access Technology (RAT).

At step 220, the UE (100) registers the second SIM (120) to at least one of the 5G RAT and the 4G Radio Access Technology (RAT).

At step 230, the UE (100) detects the event associated with one of the first SIM (110) and the second SIM (120).

Further, the UE (100) optimizes the resources of the wireless communication network.

At step 240, the UE (100) optimizes the resources of the wireless communication network by managing the registration to one of the 4G RAT and the 5G RAT based on the weighted score for the 4G RAT and the 5G RAT when the event is associated with the first SIM (110) occupying on a first transceiver (T1).

At step 250, the UE (100) optimizes the resources of the wireless communication network by managing the registration to one of the 4G RAT and the 5G RAT based on a plurality of parameters associated with the 4G RAT and the 5G RAT when the event is associated with the second SIM (120) occupying on the first transceiver (T1).

At step 260, the UE (100) optimizes the resources of the wireless communication network by suspending the 4G RAT and the 5G RAT associated with the second SIM (120) when the event is associated with the first SIM (110) occupying on the first transceiver (T1)

At step 270, the UE (100) optimizes the resources of the wireless communication network by operating one of the first SIM (110) and second SIM (120) in the dual registration mode when the event is associated with the first SIM (110).

At step 280, the UE (100) optimizes the resources of the wireless communication network by operating the first SIM (110) and second SIM (120) in the single registration mode when the event is associated with the second SIM (120).

At step 290, the UE (100) optimizes the resources of the wireless communication network by suspending and resuming the downlink data when the event is associated with the first SIM (110).

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 2B:
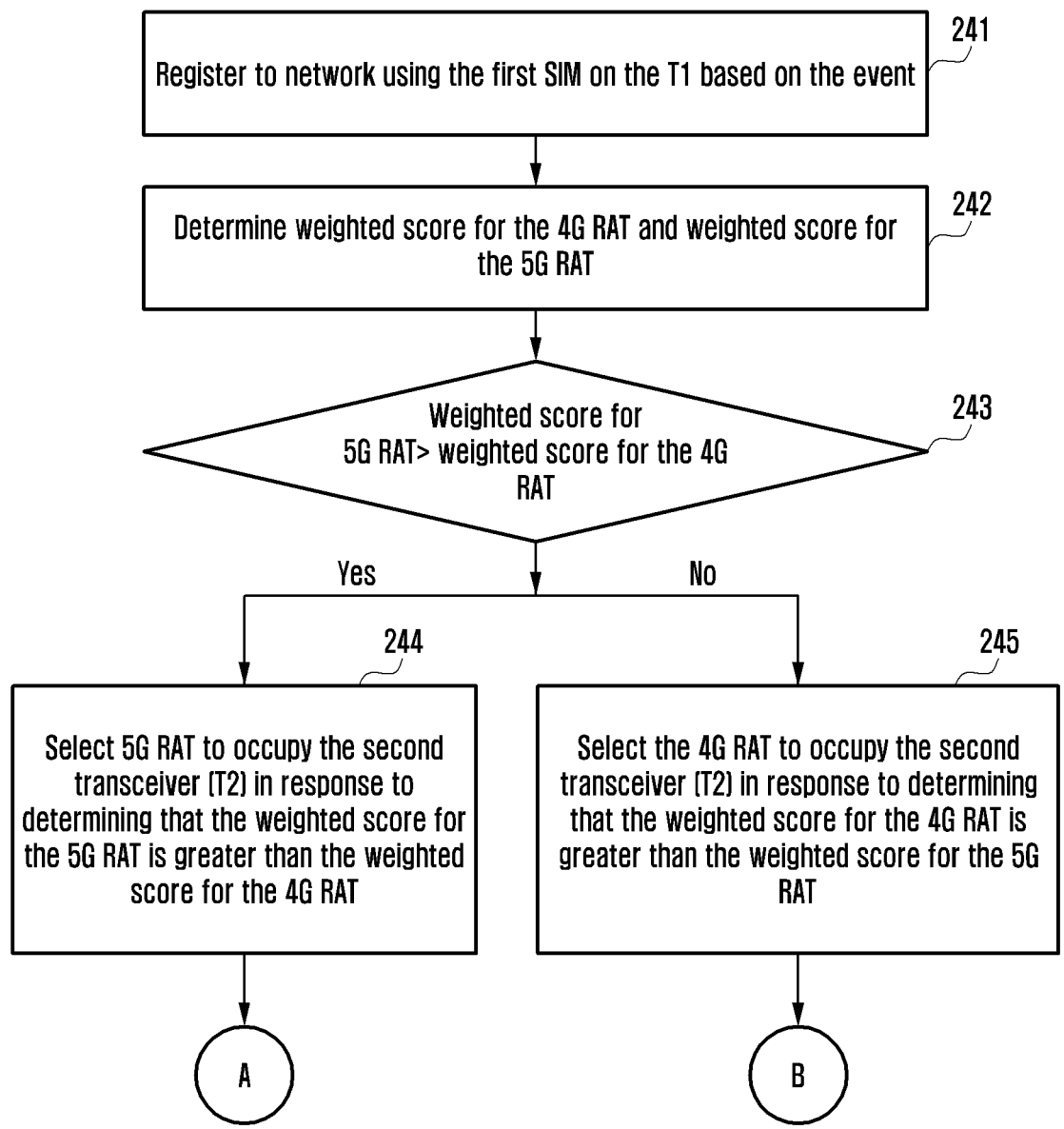
FIGS. 2BA and 2BB are a flow chart illustrating a method for managing a registration to one of a 4G RAT and a 5G RAT based on a weighted score for the 4G RAT and the 5G RAT when an event is associated with a first SIM operating on a first transceiver (T1), according to an embodiment as disclosed herein.
Figure 2B:
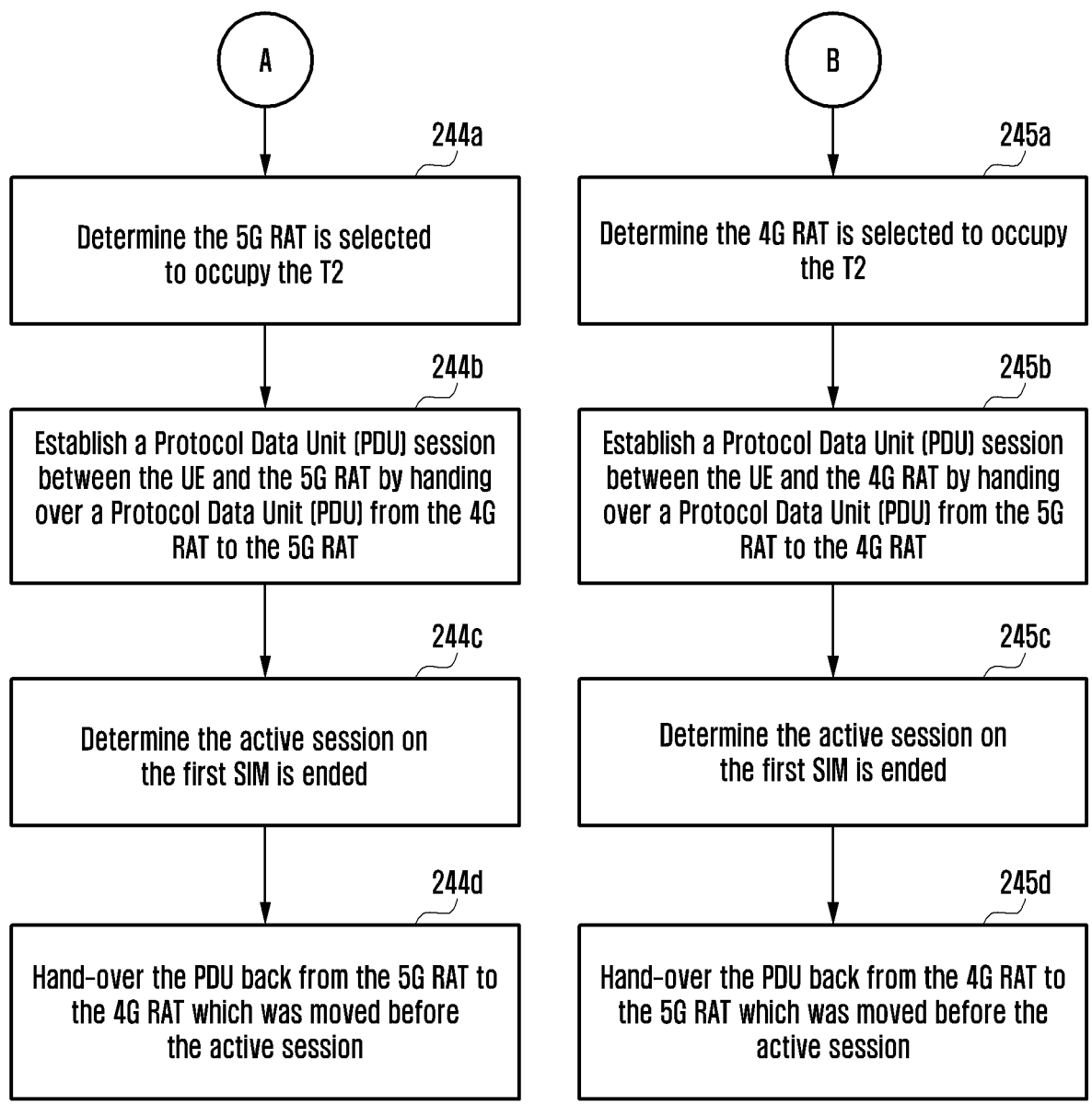

FIGS. 2BA and 2BB are a flow chart illustrating a method for managing the registration to one of the 4G RAT and the 5G RAT based on the weighted score for the 4G RAT and the 5G RAT when the event is associated with the first SIM (110) operating on the first transceiver (T1) (130) of the second SIM (120), according to an embodiment as disclosed herein.

Referring to the FIGS. 2BA and 2BB, in the UE (100) as illustrated in the FIG. 1A, the processor (160) is configured to perform the steps from 241 to 245*d*.

At step 241, the UE (100) registers to the network using the first SIM (110) on the T1 (130) based on the event. At step 242, the UE (100) determines the weighted score for the 4G RAT and the weighted score for the 5G RAT. At step 243, the UE (100) determines whether the weighted score for the 5G RAT is greater than the weighted score for the 4G RAT.

At step 244, the UE (100) selects the 5G RAT to occupy the second transceiver (T2) (140) in response to determining that the weighted score for the 5G RAT is greater than the weighted score for the 4G RAT. At step 244*a*, the UE (100) determines the 5G RAT is selected to occupy the T2 (140). At step 244*b*, the UE (100) performs one of establish the Protocol Data Unit (PDU) session between the UE (100) and the 5G RAT by handing over the Protocol Data Unit (PDU) from the 4G RAT to the 5G RAT and suspend the PDU session of the 4G RAT. At step 244*c*, the UE (100) determines the event on the first SIM (110) is ended. At step 244*d*, the UE (100) hands-over the PDU back from the 5G RAT to the 4G RAT which was moved before the active session.

At step 245, the UE (100) selects the 4G RAT to occupy the second transceiver (T2) (140) in response to determining that the weighted score for the 4G RAT is greater than the weighted score for the 5G RAT. At step 245*a*, the UE (100) determines the 4G RAT is selected to occupy the T2 (140). At step 245*b*, the UE (100) establishes the Protocol Data Unit (PDU) session between the UE (100) and the 4G RAT by handing over the Protocol Data Unit (PDU) from the 5G RAT to the 4G RAT. At step 245*c*, the UE (100) determines the event on the first SIM (110) is ended. At step 245*d*, the UE (100) perform one of hand-over of the PDU session from the 4G RAT to the 5G RAT which was moved before the event and suspend the PDU session of the 5G RAT.

Figure 2C:
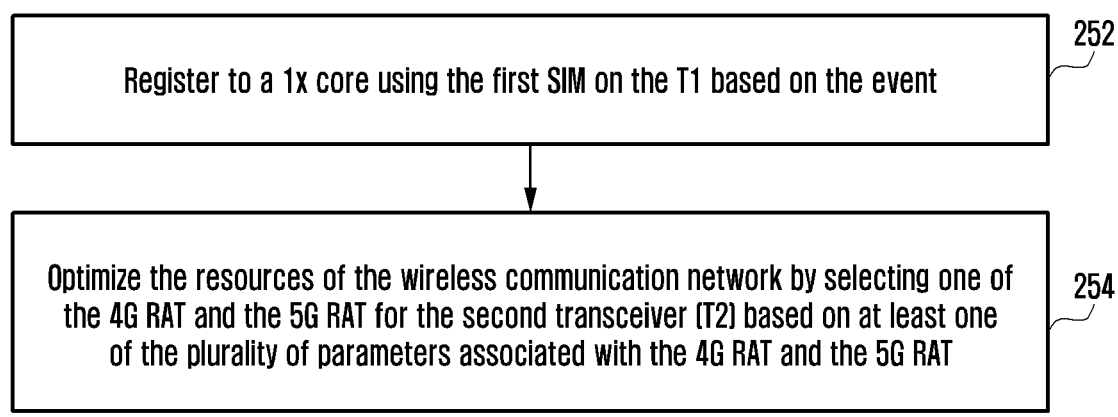
FIG. 2C is a flow chart illustrating a method for managing the registration to one of the 4G RAT and the 5G RAT based on a plurality of parameters associated with the 4G RAT and the 5G RAT when the event is associated with a second SIM operating on the first transceiver (T1), according to an embodiment as disclosed herein.

FIG. 2C is a flow chart illustrating a method for managing the registration to one of the 4G RAT and the 5G RAT on the first SIM (110) based on a plurality of parameters associated with the 4G RAT and the 5G RAT when the event is associated with the second SIM operating on the first transceiver (T1) (130), according to an embodiment as disclosed herein.

Referring to the FIG. 2C, in the UE (100) as illustrated in the FIG. 1A, the processor (160) is configured to perform the steps from 252 to 254.

At step 252, the UE (100) registers to the network of any technology using the first SIM (110) on the T1 (130) based on the event. At step 254, the UE (100) optimizes the resources of the wireless communication network by selecting one of the 4G RAT and the 5G RAT for the second transceiver (T2) (140) based on at least one of the plurality of parameters associated with the 4G RAT and the 5G RAT.

Figure 2D:
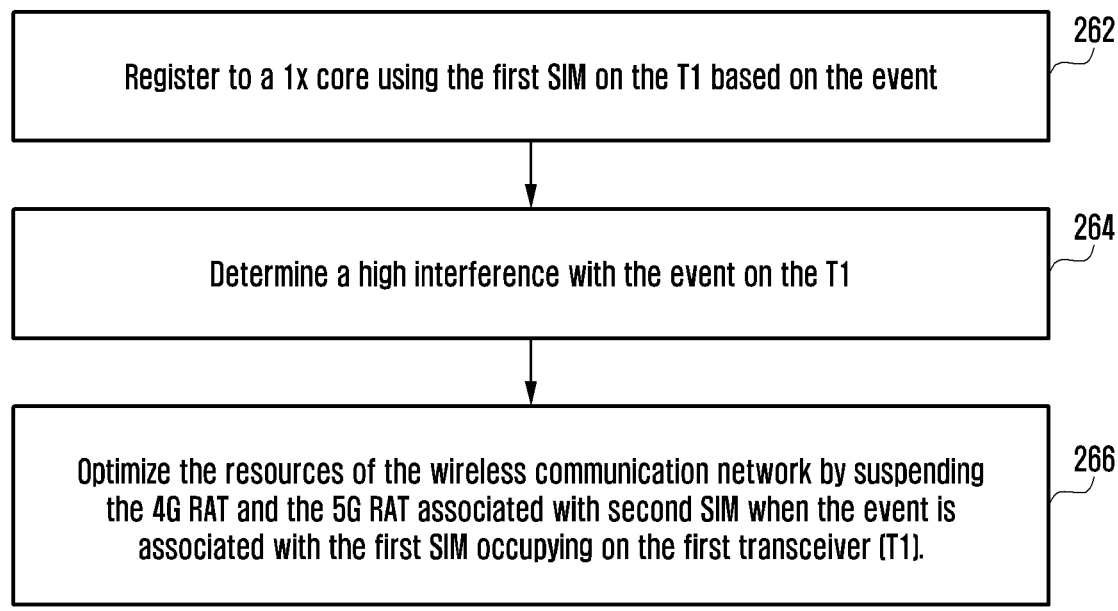
FIG. 2D is a flow chart illustrating a method for suspending the 4G RAT and the 5G RAT associated with the second SIM when the event is associated with the first SIM operating on the first transceiver (T1), according to an embodiment as disclosed herein.

FIG. 2D is a flow chart illustrating a method for suspending the 4G RAT and the 5G RAT associated with the second SIM (120) when the event is associated with the first SIM (110) occupying on the first transceiver (T1) (130), according to an embodiment as disclosed herein.

Referring to the FIG. 2D, in the UE (100) as illustrated in the FIG. 1A, the processor (160) is configured to perform the steps from 262 to 266.

At step 262, the UE (100) registers to a network using the first SIM (110) on the T1 based on the event. At step 264, the UE (100) determines a high interference with the event on the T1. At step 266, the UE (100) optimizes the resources of the wireless communication network by suspending the 4G RAT and the 5G RAT associated with the second SIM (120) when the event is associated with the first SIM (110) occupying on the first transceiver (T1).

Figure 2E:
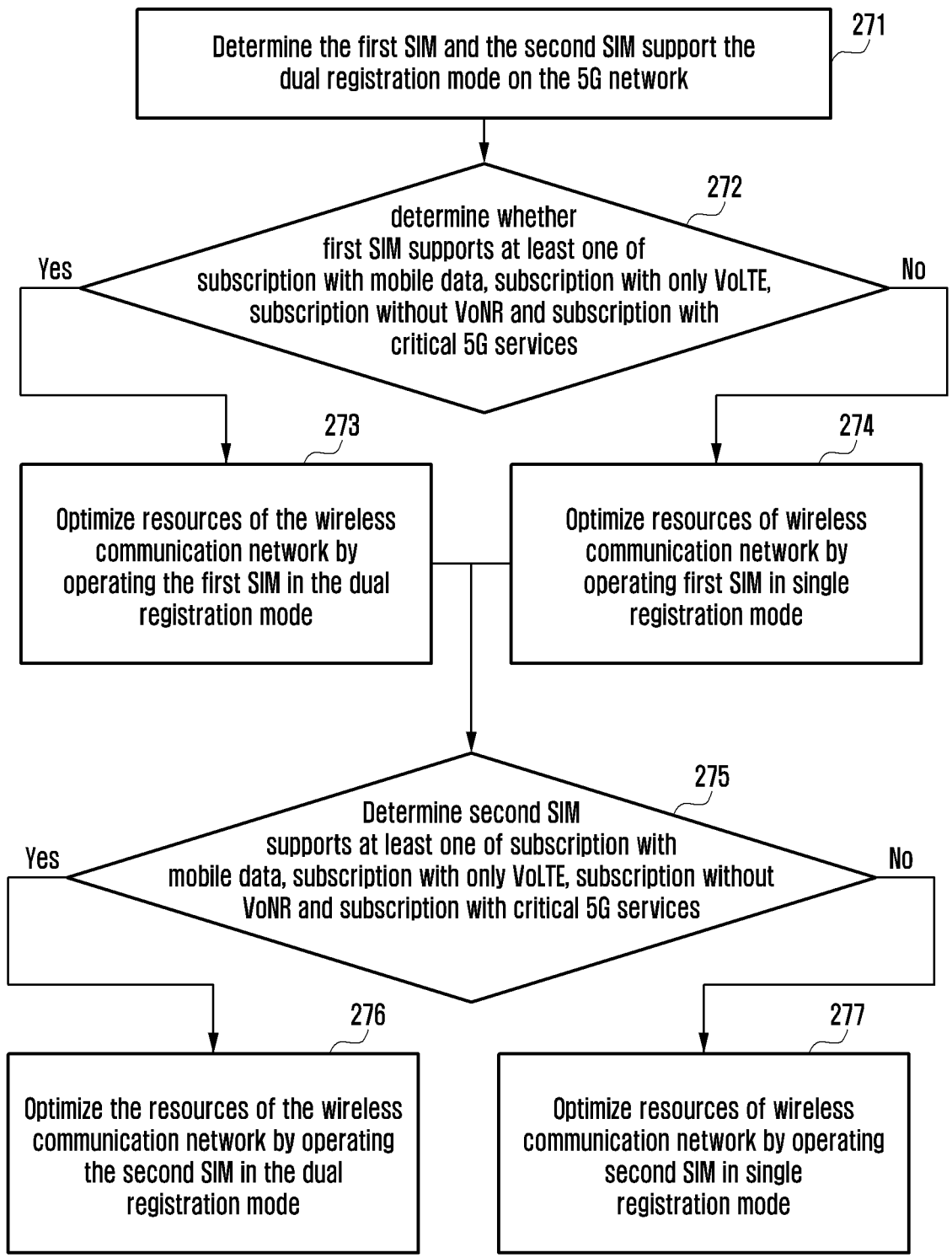
FIG. 2E is a flow chart illustrating a method for operating one of the first SIM and the second SIM in a dual registration mode when the event is associated with the first SIM, according to an embodiment as disclosed herein.

FIG. 2E is a flow chart illustrating a method for operating one of the first SIM (110) and the second SIM (120) in the dual registration mode when the event is associated with the first SIM (110), according to an embodiment as disclosed herein.

Referring to the FIG. 2E, in the UE (100) as illustrated in the FIG. 1A, the processor (160) is configured to perform the steps from 271 to 277.

At step 271, the UE (100) determines the first SIM (110) and the second SIM (120) support the dual registration mode on the 5G network.

At step 272, the UE (100) determine whether first SIM (110) supports at least one of subscription with mobile data, subscription with only the VoLTE, subscription without the VoNR and subscription with critical 5G services. At step 273, the UE (100) optimizes the resources of the wireless communication network by operating the first SIM (110) in the dual registration mode, in response to determining that the first SIM (110) supports at least one of subscription with mobile data, subscription with only VoLTE, subscription without the VoNR and subscription with critical 5G services.

At step 274, the UE (100) optimizes resources of the wireless communication network by operating first SIM (110) in the single registration mode, in response to determining that the first SIM (110) does not support at least one of subscription with mobile data, subscription with only VoLTE, subscription without the VoNR and subscription with critical 5G services.

At step 275, the UE (100) determines the second SIM (120) supports at least one of subscription with mobile data, subscription with only the VoLTE, subscription without the VoNR and subscription with critical 5G services At step 276, the UE (100) optimizes the resources of the wireless communication network by operating the second SIM (120) in the dual registration mode, in response to determining that the second SIM (120) supports at least one of the subscription with mobile data, the subscription with only the VoLTE, the subscription without the VoNR and the subscription with the critical 5G services.

At step 277, the UE (100) optimizes the resources of wireless communication network by operating second SIM (120) in single registration mode, in response to determining that the second SIM (120) does not support at least one of the subscription with mobile data, the subscription with only the VoLTE, the subscription without the VoNR and the subscription with the critical 5G services.

Figure 2F:
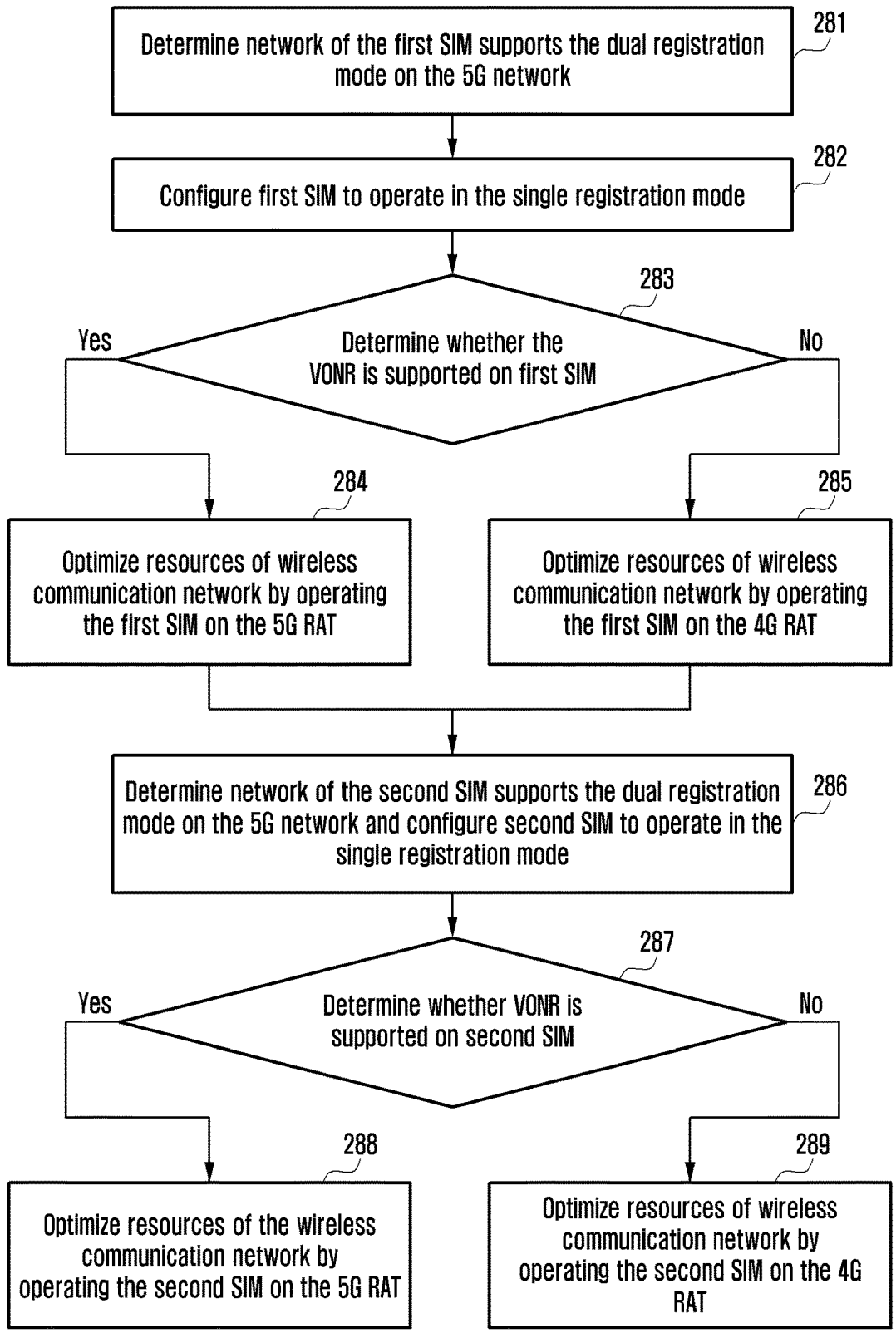
FIG. 2F is a flow chart illustrating a method for operating the first SIM and second SIM in a single registration mode when the event is associated with the second SIM, according to an embodiment as disclosed herein.

FIG. 2F is a flow chart illustrating a method for operating the first SIM (110) and second SIM (120) in the single registration mode when the event is associated with the second SIM (120), according to an embodiment as disclosed herein.

Referring to the FIG. 2F, in the UE (100) as illustrated in the FIG. 1A, the processor (160) is configured to perform the steps from 281 to 289.

At step 281, the UE (100) determines the network of the first SIM (110) supports the dual registration mode on the 5G network. At step 282, the UE (100) configures the first SIM (110) to operate in the single registration mode.

At step 283, the UE (100) determine whether the VONR is supported on first SIM (110). At step 284, the UE (100) optimizes the resources of the wireless communication network by operating the first SIM (110) on the 5G RAT, in response to determining that the VONR is supported on first SIM (110). At step 285, the UE (100) optimizes the resources of wireless communication network by operating the first SIM (110) on the 4G RAT, in response to determining that the VONR is not supported on first SIM (110).

At step 286, the UE (100) determines the network of the second SIM (120) supports the dual registration mode on the 5G network and configures the second SIM (120) to operate in the single registration mode. At step 287, the UE (100) determines whether the VONR is supported on second SIM (120). At step 288, the UE (100) optimizes the resources of the wireless communication network by operating the second SIM (120) on the 5G RAT, in response to determining that the VONR is supported on second SIM (120). At step 289, the UE (100) optimizes the resources of wireless communication network by operating the second SIM (120) on the 4G RAT, in response to determining that the VONR is not supported on second SIM (120).

Figure 2G:
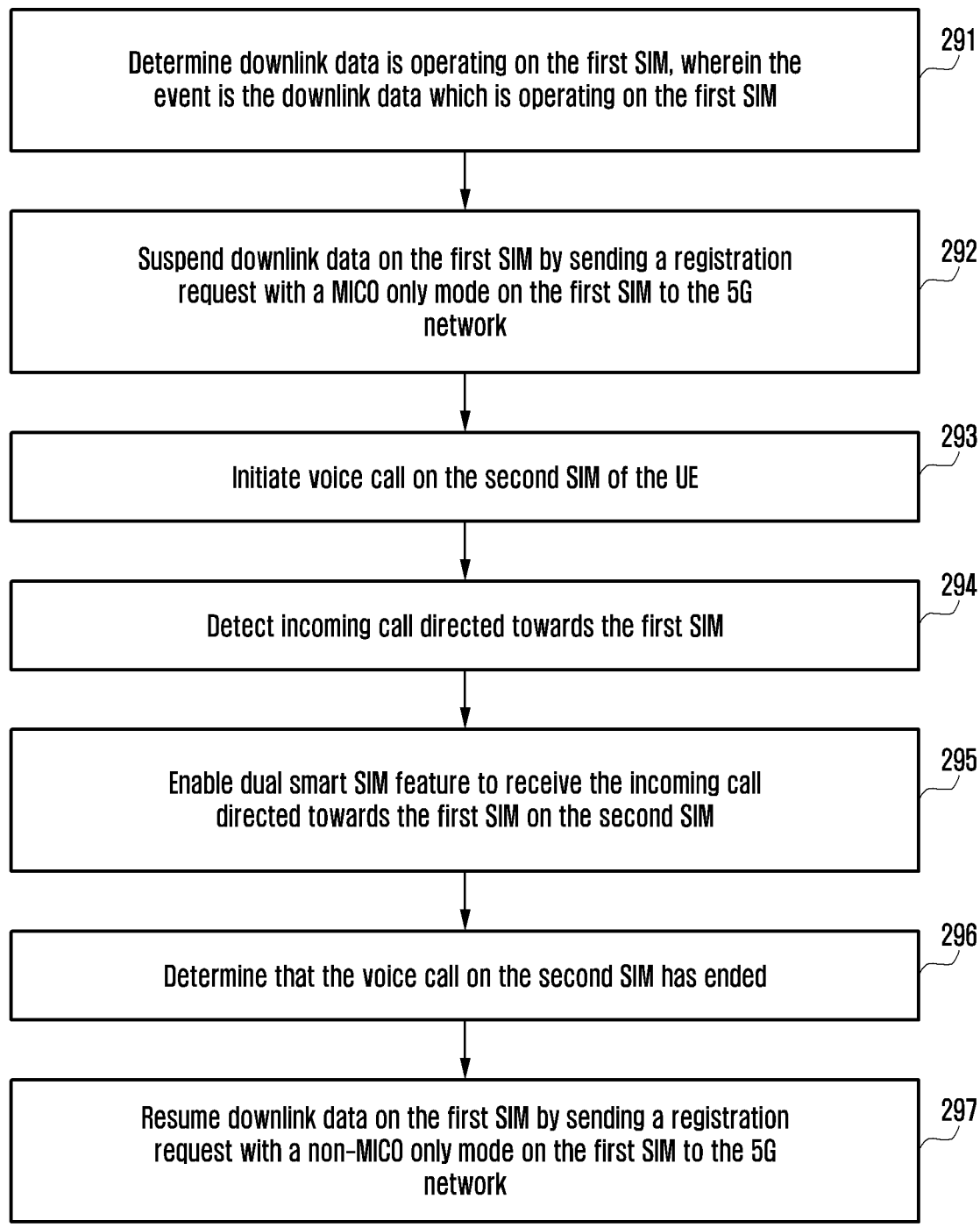
FIG. 2G is a flow chart illustrating a method for suspending and resuming a downlink data associated with the first SIM when a voice call is initiated on the second SIM, according to an embodiment as disclosed herein.

FIG. 2G is a flow chart illustrating a method for suspending and resuming the downlink data associated with the first SIM when the voice call is initiated on the second SIM, according to an embodiment as disclosed herein.

Referring to the FIG. 2G, in the UE (100) as illustrated in the FIG. 1A, the processor (160) is configured to perform the steps from 291 to 297.

At step 291, the UE (100) determines the downlink data is operating on the first SIM (110).

At step 292, the UE (100) suspends the downlink data on the first SIM (110) by sending the registration request with the MICO only mode on the first SIM (110) to the 5G network. At step 293, the UE (100) initiates the voice call on the second SIM (120) of the UE (100). At step 294, the UE (100) detects the incoming call directed towards the first SIM (110).

At step 295, the UE (100) enables the dual smart SIM feature to receive the incoming call directed towards the first SIM (110) on the second SIM (120). At step 296, the UE (100) determines that the voice call on the second SIM (120) has ended. At step 297, the UE (100) resumes the downlink data on the first SIM (110) by sending the registration request with a non-MICO only mode on the first SIM (110) to the 5G network.

Figure 3A:
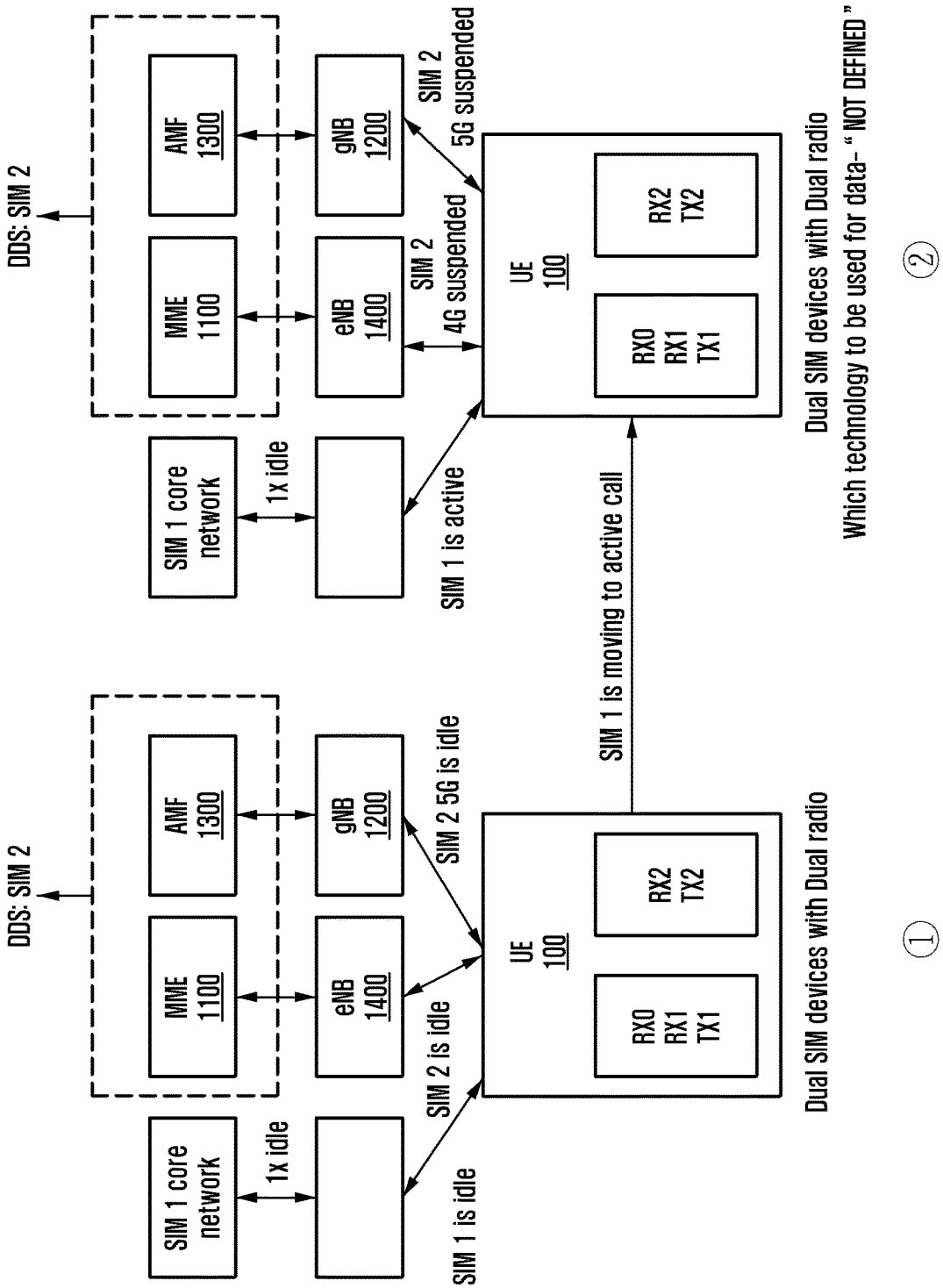
FIG. 3A illustrates a conventional mechanism for selecting one of the 4G RAT and the 5G RAT for the second SIM by the UE during an incoming call on the first SIM, according to a prior art.

FIG. 3A illustrates a conventional mechanism for selecting one of the 4G RAT and the 5G RAT for the second SIM (120) by the UE (100) during an incoming call on the first SIM (110), according to a prior art.

Consider the UE (100) with a dual radio which supports dual registration on the second SIM (120) with a data distribution service (DDS) is active on the second SIM (120). At step 1, both the first SIM (110) and the second SIM (120) are in idle mode i.e., there is no active session on both the first SIM (110) and the second SIM (120).

At step 2, consider that the first SIM (110) receives the incoming call on the T1 (130). In the conventional methods and systems when there is the incoming call only one of the transceivers can be used by the first SIM (110) i.e., only T1 (130) can be used by the first SIM (110). However, there exists no procedure to determine whether the data service on the second SIM (120) should be provided by the 4G RAT or the 5G RAT on the T2 (140). Therefore, on the second SIM (120) both the 4G service and the 5G service is suspended.

Figure 3B:
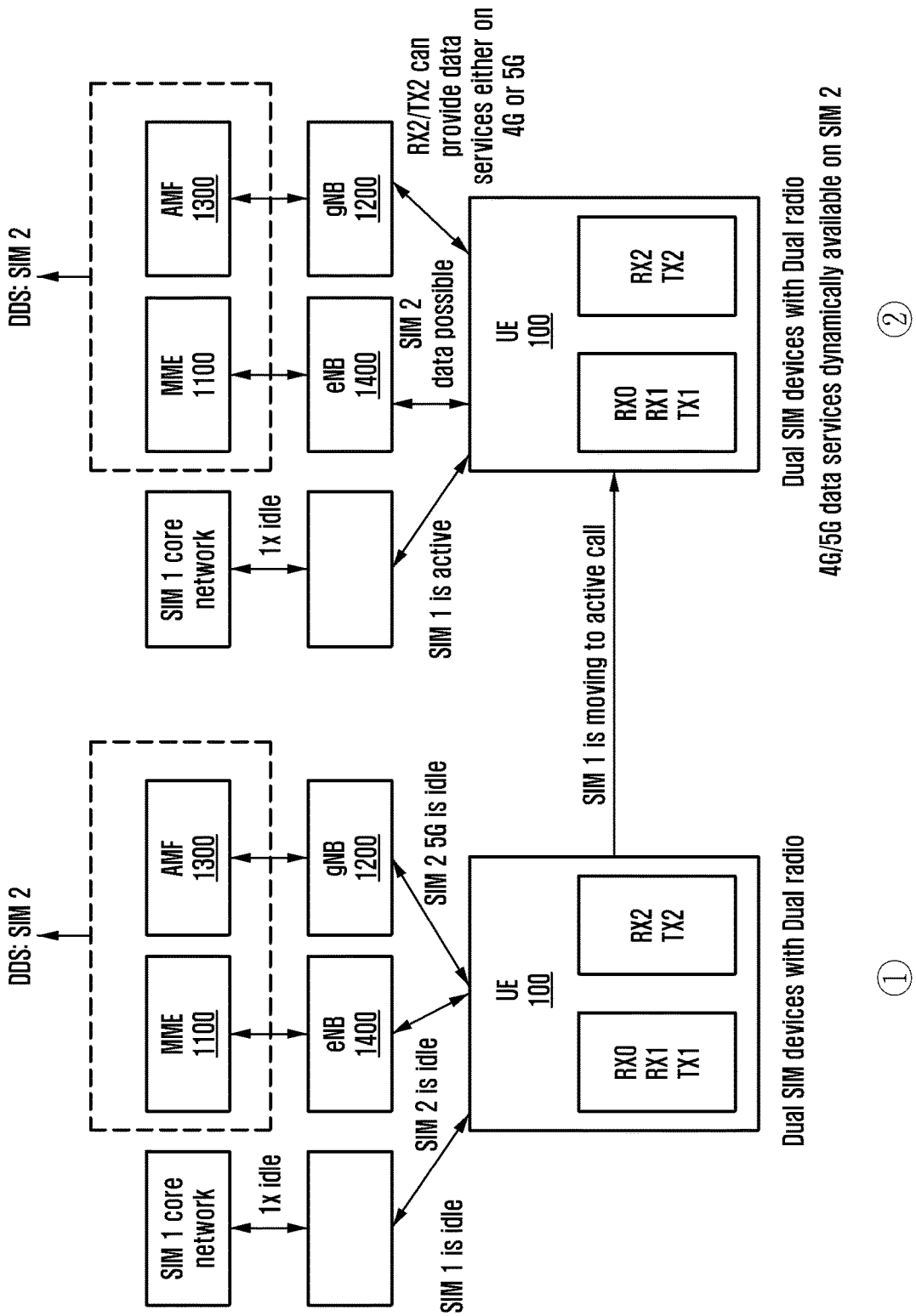
FIG. 3B illustrates a mechanism for selecting one of the 4G RAT and the 5G RAT for the second SIM by the UE during the incoming call on the first SIM based on the weighted score for the 4G RAT and the weighted score for the 5G RAT, according to an embodiment as disclosed herein.

FIG. 3B illustrates a mechanism for selecting one of the 4G RAT and the 5G RAT for the second SIM (120) by the UE (100) during the incoming call on the first SIM (110) based on the weighted score for the 4G RAT and the weighted score for the 5G RAT, according to an embodiment as disclosed herein.

Referring to the FIG. 3B, in conjunction with the FIG. 3A, at step 2, in the proposed method the UE (100) provides the data services dynamically by selecting one of the 4G RAT and the 5G RAT on the T2 (140) using the second SIM (120) based on the weighted score for the 4G RAT and weighted score for the 5G RAT.

In another embodiment, the UE (100) selects one of the 4G RAT and the 5G RAT on the T2 (140) based on the plurality of parameters associated with the 4G RAT and the 5G RAT.

Figure 3C:
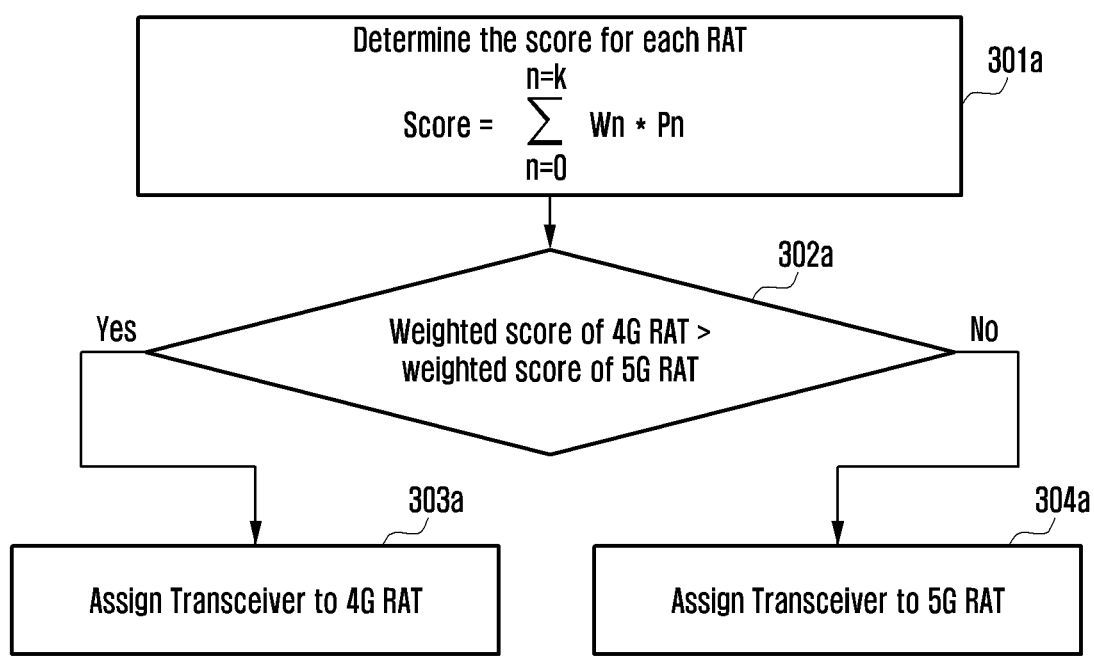
FIG. 3C is an example illustrating a method for determination of the weighted score for the 4G RAT and the 5G RAT, and selection of one of the 4G RAT and the 5G RAT based on the weighted score, according to an embodiment as disclosed herein.

FIG. 3C is an example illustrating a method for determination of the weighted score for the 4G RAT and the 5G RAT, and selection of one of the 4G RAT and the 5G RAT based on the weighted score, according to an embodiment as disclosed herein.

Referring to the FIG. 3C, at step 301, the weighted score for the 4G RAT and 5G RAT is determined based on the plurality of parameters. The plurality of parameters are at least one of voice availability for paging, the T2 Radio frequency (RF) chain availability during a voice call on the T1, a Radio Access Technology (RAT) interference, transmission power level, coverage of the 4G RAT, coverage of the 5G RAT, a user subscription, a home area, a roaming area, active protocol data unit (PDU) preference, quality of service (QOS) requirement, predicted data rate of the 4G RAT, predicted data rate of the 5G RAT, determined data rate of the 4G RAT and determined data rate of the 5G RAT, operator preferences and user preferences. The voice availability for paging parameter determines whether the voice is available on both the 4G RAT and the 5G RAT. The T2 Radio frequency (RF) chain availability during a voice call on the T1 parameter determines if the RF chain for both the 4G and the 5G RAT is available to T2 during the voice call on the T1. The RAT interference parameter determines an interference level of operating bands of each of the 4G and the 5G RAT with other band on the T1. The transmission power level determines whether the UE (100) is closer to the 4G or the 5G RAT which in turn will determine the UE (100) transmit power. The coverage of the 4G RAT and the coverage of the 5G RAT indicate whether both the 4G RAT and the 5G RAT provide the coverage to the UE (100). The user subscription parameter determines the user/operator preferred RAT for providing the data. The home or roaming area parameter determines the user/operator preferred RAT for providing the data in roaming. The active PDUs preference/QOS requirement parameter determines the PDUs active on the second SIM (120) has the QOS requirement of which of the 4G RAT and the 5G RAT. The predicted/determined data rates of each of the 4G RAT and the 5G RAT determine the average throughput on the 4G RAT and the 5G RAT.

Further, the weights associated with the each of the parameters of the plurality of parameters can be dynamically changed for each parameter based on the value of the parameter. For example, if voice availability for paging parameter is only available for the 4G RAT, then if Monitoring paging is needed as part of UE (100) implementation, then the voice availability for paging parameter will get 100% weightage and the other parameters of the plurality of parameters will be given 0 weightage.

In another example, consider that the T2 (140) RF chain availability during voice call on the T1 (130) is available only for the 4G RAT, then the T2 (140) RF chain availability during voice call on the T1 (130) parameter will get 100% weightage and the other parameters of the plurality of parameters will be given 0 weightage.

However in the examples described above, if the parameters considered are available for both the 4G RAT and the 5G RAT then the weightage of the parameters considered will become less and the other parameters of the plurality of parameters will be given higher weightage i.e., the weightage is assigned dynamically based on the implementation.

The weighted score for the 4G RAT and the weighted score for the 4G RAT are determined as follows:

$$\text{Weighted score for the 4G RAT} = \sum_{n=0}^{n=k} W_n * P_n \quad (1)$$

where W is a weight assigned to each parameter of the plurality of parameters used to determine the weighted score for the 4G RAT P is a parameter value of each parameter of the plurality of parameters used to determine the weighted score for the 4G RAT n is the number of parameters considered for determining the weighted score for the 4G RAT.

$$\text{Weighted score for the 5G RAT} = \sum_{n=0}^{n=k} W_n * P_n \quad (2)$$

where W is a weight assigned to each parameter of the plurality of parameters used to determine the weighted score for the 5G RAT P is a parameter value of each parameter of the plurality of parameters used to determine the weighted score for the 5G RAT n is the number of parameters considered for determining the weighted score for the 5G RAT.

At step 302, the UE (100) compares the weighted score for the 4G RAT and the weighted score for the 5G RAT.

Further, in response to determining that the weighted score for the 4G RAT is greater than the weighted score for the 5G RAT, the UE (100) selects the 4G RAT to occupy the T2 (140) (as shown in step 303) and in response to determining that the weighted score for the 5G RAT is greater than the weighted score for the 4G RAT, the UE (100) selects the 5G RAT to occupy the T2 (140) (as shown in step 304).

Figure 3D:
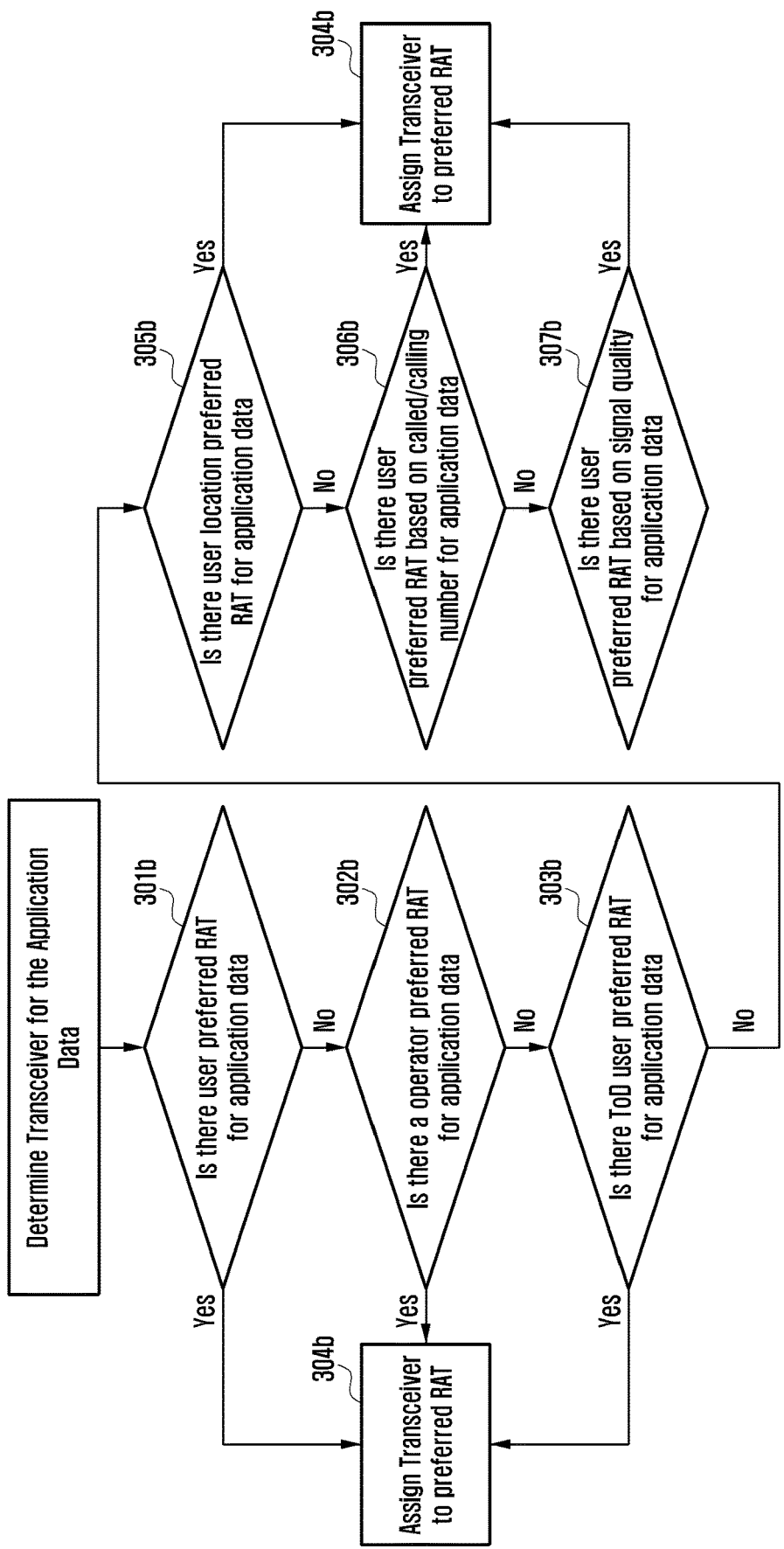
FIG. 3D is an example illustrating a method for selection of one of the 4G RAT and the 5G RAT for the second SIM by the UE during the incoming call on the first SIM is performed based on the plurality of parameters associated with the 4G RAT and the 5G RAT, according to an embodiment as disclosed herein.

FIG. 3D is an example illustrating a method for selection of one of the 4G RAT and the 5G RAT for the second SIM (120) by the UE (100) during the incoming call on the first SIM (110) is performed based on the plurality of parameters associated with the 4G RAT and the 5G RAT, according to an embodiment as disclosed herein.

In another embodiment, the data services dynamically provided on the second SIM (120) by selecting one of the 4G RAT and the 5G RAT based on at least one of the plurality of parameters associated with the 4G RAT and the 5G RAT. The at least one of the plurality of parameters associated with the 4G RAT and the 5G RAT is the user preferred RAT for application data, the operator preferred RAT for the application data, the user location preferred RAT for the application data, the user preferred RAT based on the called number, the user preferred RAT based on the calling number, the user preferred RAT based on the signal quality, the operator location preferred RAT for the application data, the operator preferred RAT based on the called number, the operator preferred RAT based on the calling number, the operator preferred RAT based on the signal quality, etc.

Referring to the FIG. 3D, the selection of one of the 4G RAT and the 5G RAT for the second SIM (120) by the UE (100) is done by considering at least one of the plurality of parameters associated with the 4G RAT and the 5G RAT. At step 301*b*, the UE (100) determines whether the user has defined any specific preferred RAT for providing the application data. In response to determining that the user has defined any specific preferred RAT for providing the application data, the UE (100) selects the user preferred RAT for providing the application data (step 304*b*). In response to determining that the user has not defined any specific preferred RAT for providing the application data, the UE (100) checks whether the operator has defined any specific preferred RAT for providing the application data (step 302*b*). In response to determining that the operator has defined any specific preferred RAT for providing the application data, the UE (100) selects the operator preferred RAT for providing the application data (step 304*b*). Similarly, at steps 303*b*, 305*b*, 306*b* and 307*b*, the UE (100) selects one of the 4G RAT and the 5G RAT for the second SIM (120) by the UE (100) based on the at least one parameter.

Further, the selection of one of the 4G RAT and the 5G RAT for the second SIM (120) by the UE (100) is performed based on one of the user preference or the operator preference.

Figure 3E:
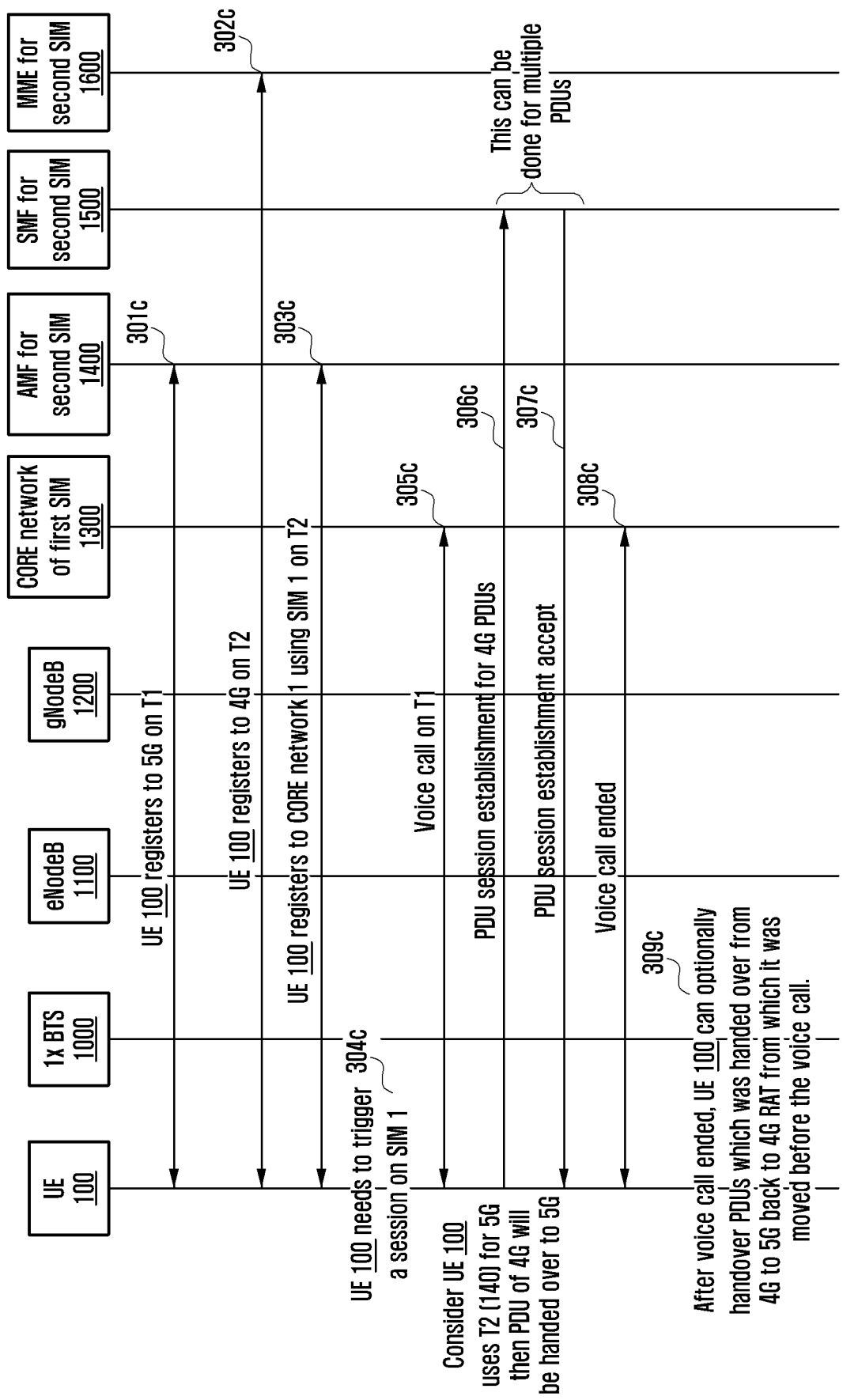
FIG. 3E is a signaling diagram illustrating a method for selection of one of the 4G RAT and the 5G RAT for the second SIM by the UE during the incoming call on the first SIM by a handover of the protocol data unit (PDU) from a Non-Active RAT to an active RAT, according to an embodiment as disclosed herein.

FIG. 3E is a signaling diagram illustrating a method for selection of one of the 4G RAT and the 5G RAT for the second SIM (120) by the UE (100) during the incoming call on the first SIM (110) by a handover of the PDU from a Non-Active RAT to an active RAT, according to an embodiment as disclosed herein.

Referring to the FIG. 3E, consider that the UE (100) is a dual radio capable dual SIM device. At step 301*c*, the UE (100) registers on the first SIM (110) in a single registration mode. In case the first SIM (110) is active, then the first SIM (110) uses the T1 (130).

At step 302*c*, the UE (100) registers the second SIM (120) with a Mobility Management Entity (MME) (1600) of the second SIM (120) in the dual registration mode with dual radio. The second SIM (120) uses the T1 (140) on one of the 4G RAT and the 5G RAT.

Further, in case there is no event associated with the first SIM (110) then, the second SIM (120) latches to the 5G RAT on the T1 (130) and one of the second SIM (120) latches to the 4G RAT and the first SIM (110) will share the T2 (140) i.e., at step 303*c*, the UE (100) registers to the CORE network 1 using the first SIM (110) on the T2 (140). At step 304*c*, the UE (100) determines that the active session needs to be triggered on the first SIM (110) and at step 305*c*, the UE (100) initiates a voice call on the first SIM (110) on the T1 (130).

Further, the UE (100) selects one of the 4G RAT and the 5G RAT to use the T2 (140) based on one of the procedures described in the FIG. 3C and the FIG. 3D. Further, the PDUs on a Non-Active RAT are handed over to an active RAT or the PDUs on the Non-Active RAT are suspended. Consider that the UE (100) selects the 5G RAT to use the T2 (140), then the Protocol Data Unit (PDU) associated with the 4G RAT will be handed over to the 5G RAT by sending a PDU session establishment request to the 4G RAT. In the PDU session establishment request, the type is mentioned as handover to indicate to the 4G RAT to hand over the PDUs to the 5G RAT, as shown in steps 306*c* and step 307*c*.

At step 308*c*, the UE (100) determines that the voice call on the first SIM (110) on the T1 (130) is ended. In response to determining that the voice call on the first SIM (110) on the T1 (130) is ended, the UE (100) hands over the PDUs which was handed over from the 4G RAT to the 5G RAT back to the 4G RAT from which the PDUs were handed over to the 5G RAT, as shown in step 309*c*.

Therefore, in the proposed method the UE (100) will be able to provide one of the 5G service and the 4G service based on a requirement on the second SIM (120) even when there is the active session on the first SIM (110).

FIG. 3F is a signaling diagram illustrating a method for selection the 5G RAT for the second SIM (120) by the UE (100) during the incoming call on the first SIM (110) by suspending the 4G RAT, according to an embodiment as disclosed herein.

Referring to the FIG. 3F, in conjunction with the FIG. 3E, steps 301*d* to 305*d* may be substantially the same as steps 301*c* to 305*c*, and, thus repeated description is omitted.

Consider that the UE (100) selects the 5G RAT to use the T2 (140), then the Protocol Data Unit (PDU) associated with the 4G RAT will be suspended. At step 306*d*, the UE (100) sends a Non-Access Stratum (NAS) message to suspend the PDUs associated with the 4G RAT.

Further, at step 307*d*, the UE (100) determines that the voice call on the first SIM (110) on the T1 (130) is ended. In response to determining that the voice call on the first SIM (110) on the T1 (130) is ended, the UE (100), at step 308*d*, resumes the 4G RAT.

Figure 3G:
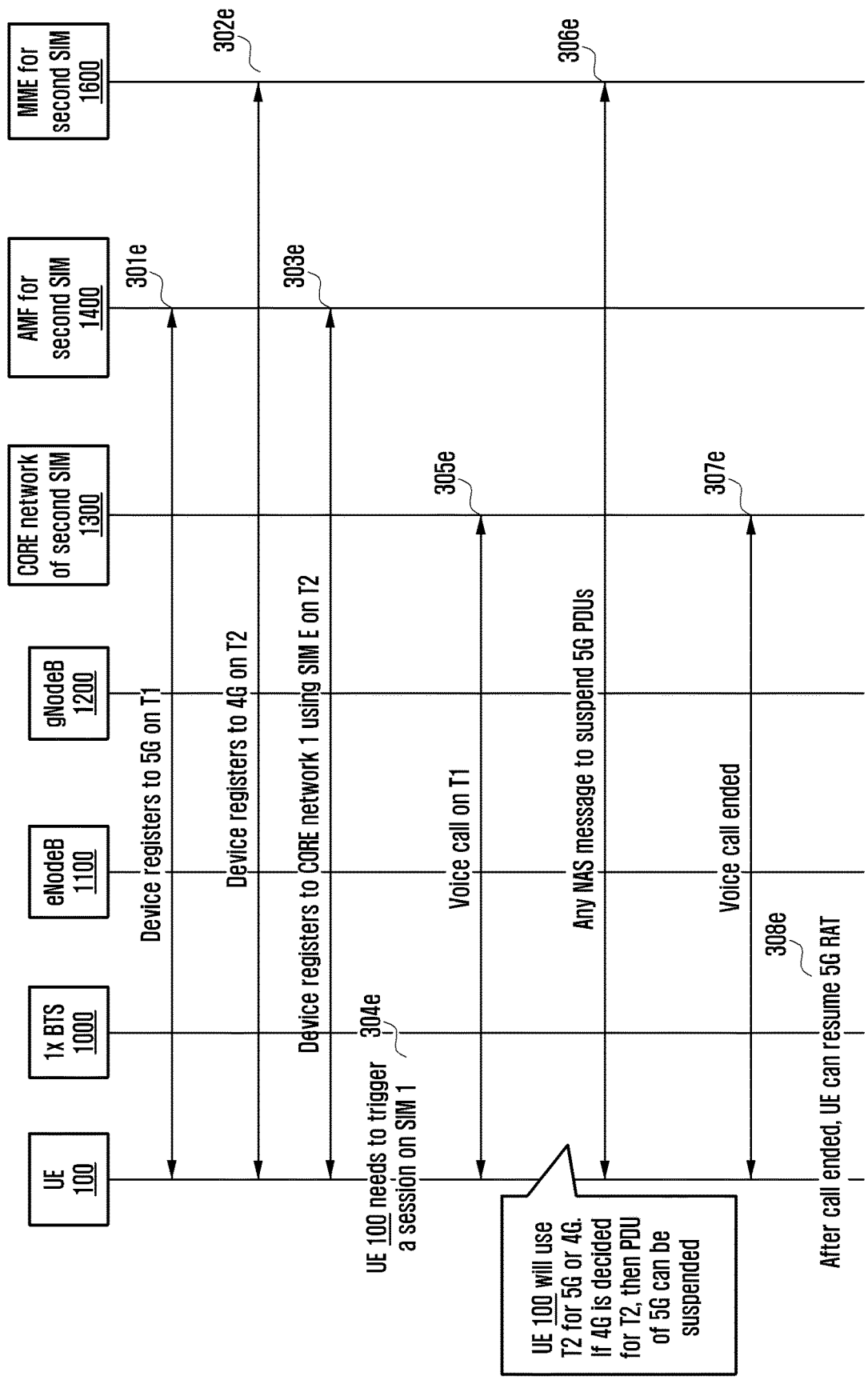
FIG. 3G is a signaling diagram illustrating a method for selection the 4G RAT for the second SIM by the UE during the incoming call on the first SIM by suspending the 5G RAT, according to an embodiment as disclosed herein.

FIG. 3G is a signaling diagram illustrating a method for selection the 4G RAT for the second SIM (120) by the UE (100) during the incoming call on the first SIM (110) by suspending the 5G RAT, according to an embodiment as disclosed herein.

Referring to the FIG. 3G, in conjunction to the FIG. 3F, steps 301*e* to 305*e* may be substantially the same as steps 301*d* to 305*d*, and, thus repeated description is omitted.

Consider that the UE (100) selects the 4G RAT to use the T2 (140), then the Protocol Data Unit (PDU) associated with the 5G RAT will be suspended. At step 306*e*, the UE (100) sends a Non-Access Stratum (NAS) message to suspend the PDUs associated with the 5G RAT.

Further, at step 307*e*, the UE (100) determines that the voice call on the first SIM (110) on the T1 (130) is ended. In response to determining that the voice call on the first SIM (110) on the T1 (130) is ended, the UE (100), at step 308*e*, resumes the 5G RAT.

Figure 3H:
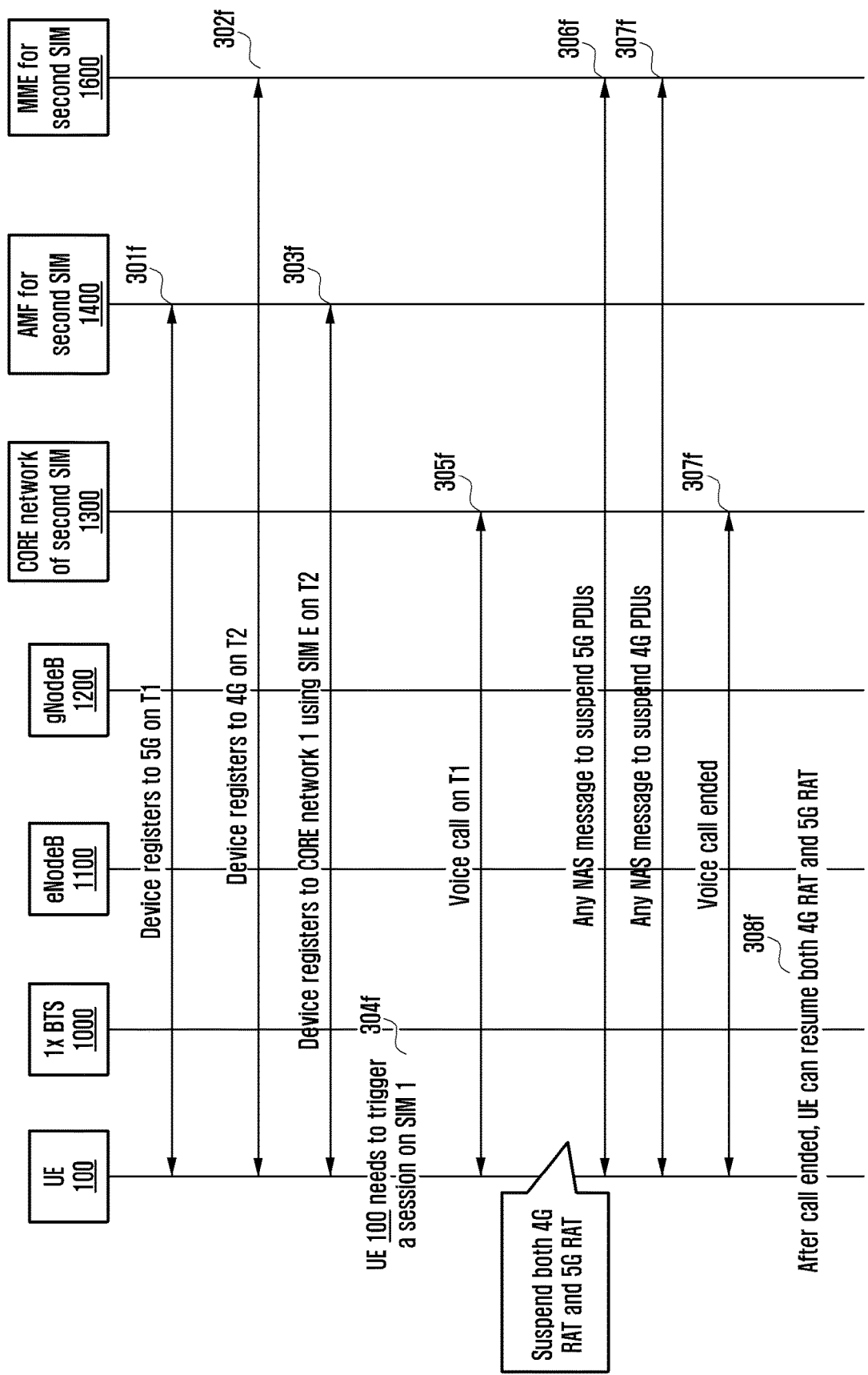
FIG. 3H is a signaling diagram illustrating a method for optimizing the resources of the wireless communication network by suspending the 4G RAT and the 5G RAT associated with the second SIM when the event is associated with the first SIM occupying on the T1, according to an embodiment as disclosed herein.

FIG. 3H is a signaling diagram illustrating a method for optimizing the resources of the wireless communication network by suspending the 4G RAT and the 5G RAT associated with the second SIM (120) when the event is associated with the first SIM (110) occupying on the T1 (130), according to an embodiment as disclosed herein.

Referring to the FIG. 3H, in conjunction to the FIG. 3E, steps 301*f* to 305*f* may be substantially the same as steps 301*c* to 305*c*, and, thus repeated description is omitted. The UE (100) determines a high interference with the voice call which is initiated on the T1 (130). In the proposed method, when there is high interference with the voice call on the T1 (130), the T2 (140) can be completely switched off by suspending both the 4G RAT and the 5G RAT on the T2 (140).

At step 306*f*, the UE (100) sends the NAS message to the 5G RAT and suspends the PDU associated with the 5G RAT and at step 307*f*, the UE (100) sends the NAS message to the 4G RAT and suspends the PDU associated with the 4G RAT. Further, at step 308*f*, the UE (100) determines that the voice call on the first SIM (110) on the T1 (130) is ended. In response to determining that the voice call on the first SIM (110) on the T1 (130) is ended, the UE (100), at step 309*f*, resumes both the 5G RAT and the 4G RAT.

Figure 3I:
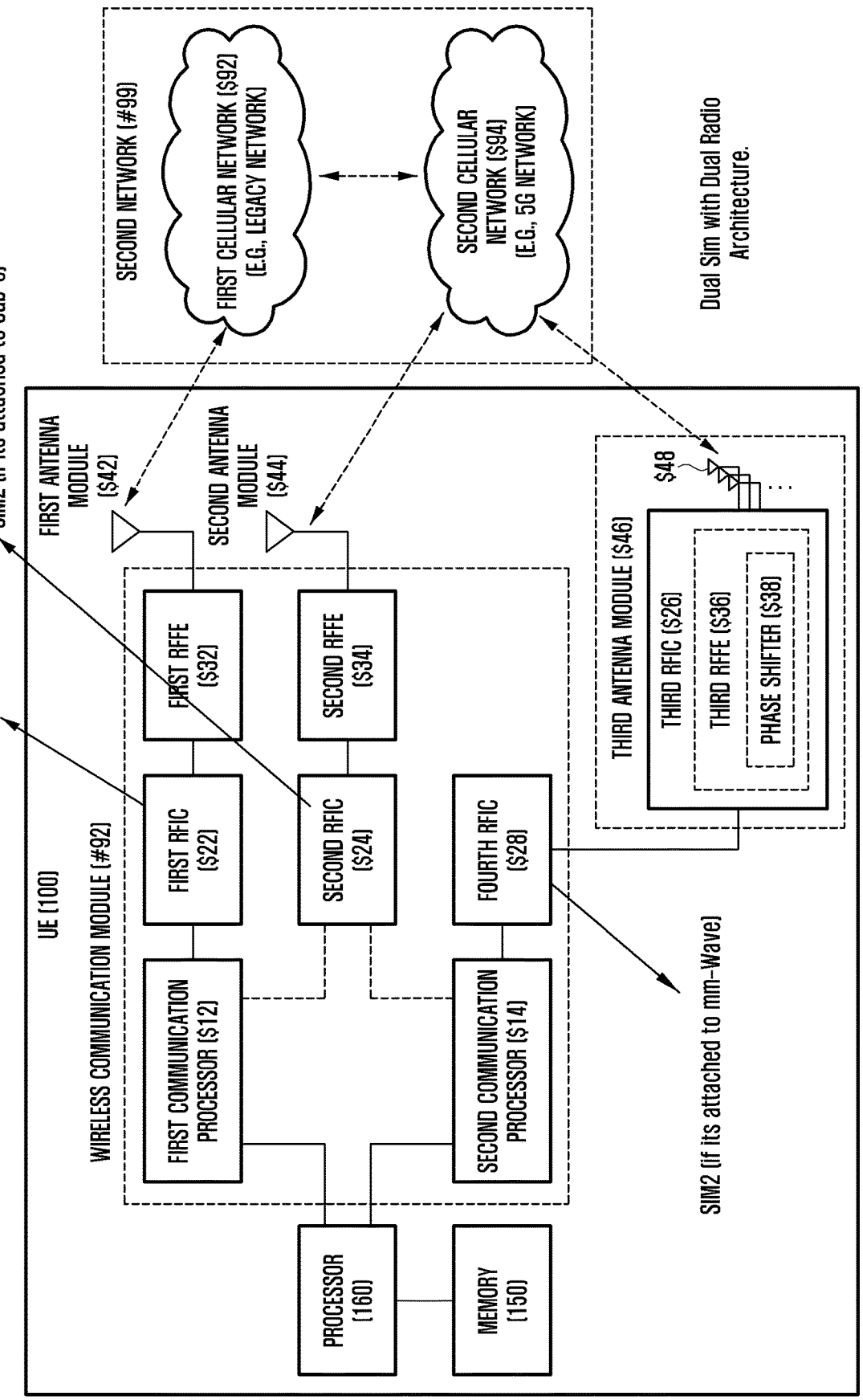
FIG. 3I is a block diagram illustrating the UE supporting dual SIM with dual radio, according to an embodiment as disclosed herein.

FIG. 3I is a block diagram illustrating the UE (100) supporting dual SIM with dual radio, according to an embodiment as disclosed herein.

Referring to the FIG. 3I, in an embodiment, a first communication processor ($12) and a second communication processor ($14) may be directly or indirectly connected to each other by an interface (not shown) to provide or receive data or control signals in either direction or in both directions.

A first RFIC ($22) may convert a baseband signal generated by the first communication processor ($12) into a radio frequency (RF) signal of about 700 MHz to about 3 GHz used in a first cellular network ($92) (e.g., a legacy network) at transmission. Upon reception, the RF signal may be obtained from the first cellular network (e.g., a legacy network) through an antenna (e.g., a first antenna module ($42)), and may be preprocessed through an RFFE (e.g., a first RFFE ($32)). The first RFIC ($22) may convert the preprocessed RF signal into a baseband signal so as to be processed by the first communication processor ($12).

A second RFIC ($24) may convert, upon transmission, a baseband signal generated by the first communication processor ($12) or the second communication processor ($14) into the RF signal (e.g., about 6 GHz or less) in a sub-6 band (e.g., a 5G Sub6 RF signal) used in the second cellular network ($94) (e.g., a 5G network). In reception, the 5G Sub6 RF signal may be obtained from the second cellular network ($94) (e.g., the 5G network) through an antenna (e.g., the second antenna module ($44), and preprocessed through the RFFE (e.g., a second RFFE ($34)). The second RFIC ($24) may convert the preprocessed 5G Sub6 RF signal into a baseband signal so that it can be processed by a corresponding communication processor among the first communication processor ($12) or the second communication processor ($14).

A third RFIC ($26) may convert the baseband signal generated by the second communication processor ($14) into the RF signal (hereinafter, an RF signal (hereinafter, about 6 GHz to about 60 GHz) of a 5G reserved ve6 band to be used in the second cellular network ($94) (e.g., a 5G conveve6 RF signal). In reception, the 5G enclove6 RF signal may be obtained from the second cellular network ($94) (e.g., a 5G network) through the antenna (e.g., an antenna ($48) and preprocessed through the third RFFE ($36). The third RFIC ($26) may convert the preprocessed 5G manipve6 RF signal into a baseband signal so as to be processed by the second communication processor ($14). According to another embodiment, the third RFFE ($36) may be formed as a part of the third RFIC ($26).

In another embodiment, the UE (100) may include a fourth RFIC ($28), separate from or at least a part of the third RFIC ($26). The fourth RFIC ($28) may convert the baseband signal generated by the second communication processor ($14) into the RF signal (hereinafter, an IF signal) of an intermediate frequency band (e.g., about 9 GHz to about 11 GHz), and then transmit the Intermediate Frequency (IF) signal to the third RFIC ($26). The third RFIC ($26) can convert the IF signal into a 5G conveve6 RF signal. At reception, the 5G enclove6 RF signal may be received from the second cellular network ($94) (e.g., the 5G network) through the antenna (e.g., an antenna ($48) and converted into the IF signal by the third RFIC ($26). The fourth RFIC ($28) can convert the IF signal into the baseband signal so that the second communication processor ($14) can be processed.

Figure 3J:
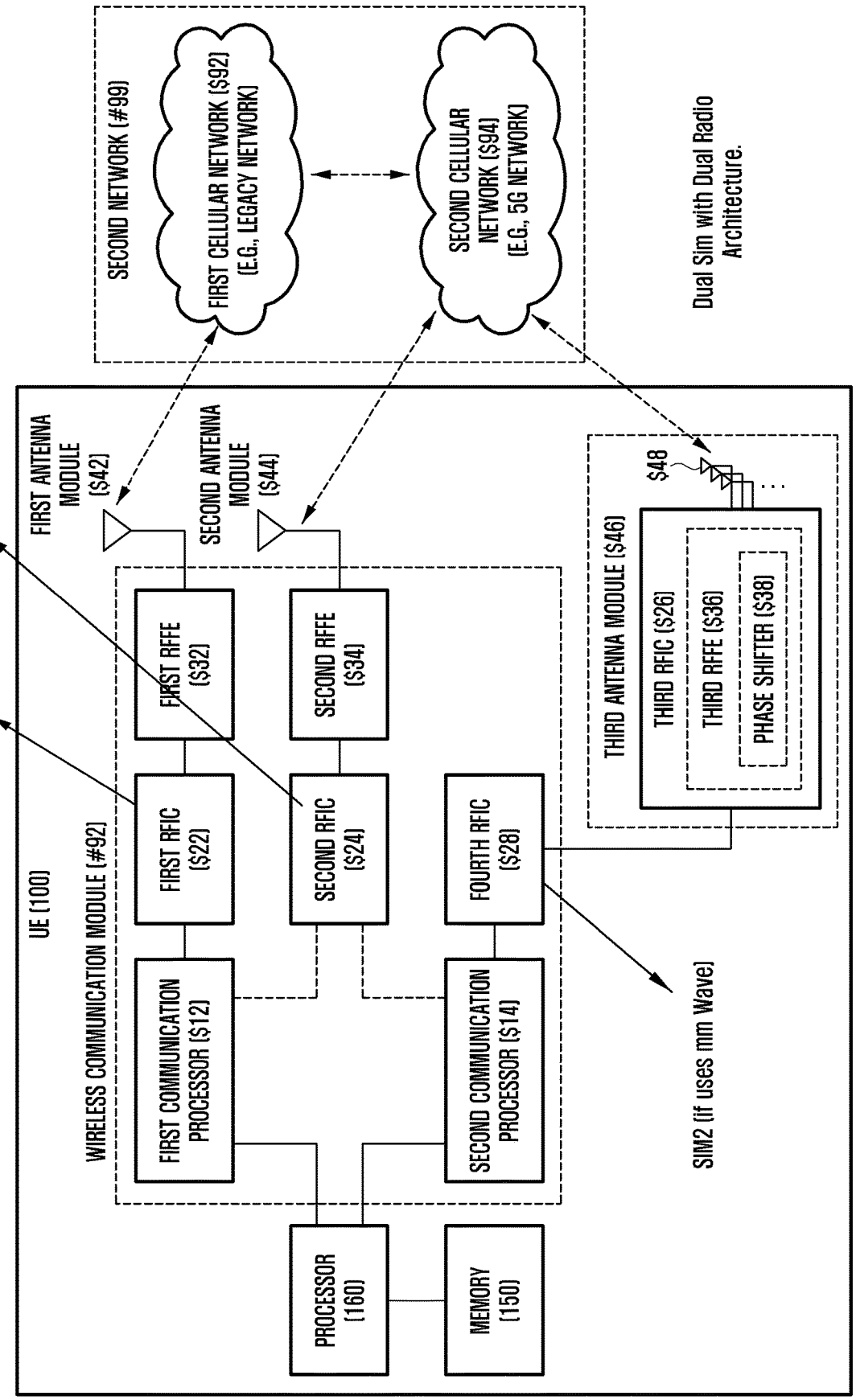
FIG. 3J is another block diagram illustrating the UE supporting dual SIM with dual radio, according to an embodiment as disclosed herein.

FIG. 3J is another block diagram illustrating the UE (100) supporting dual SIM with dual radio, according to an embodiment as disclosed herein.

Referring to the FIG. 3J, in an example the first RFIC ($22) and the second RFIC ($24) may be implemented as at least part of a single chip or a single package. Also, the first RFFE ($32) and the second RFFE ($34) may be implemented as at least part of a single chip or a single package. Further, at least one antenna module among the first antenna module ($42) or the second antenna module ($44) may be omitted or coupled with another antenna module to process RF signals of the corresponding plurality of bands.

According to one embodiment, the third RFIC ($26) and the antenna ($48) may be disposed in the same sub frame to form the third antenna module ($46). For example, the wireless communication module (#92) or the processor (160) may be disposed on a first sub frame (e.g., a main PCB). In this case, a third RFIC ($26) may be disposed in some areas (e.g., a sub PCB) separate from the first sub frame (e.g., a sub PCB), and an antenna ($48) may be disposed in some other areas (e.g., the upper surface), and a third antenna module ($46) may be formed. It is possible to reduce the length of the transmission line there between by placing the third RFIC ($26) and the antenna ($48) in the same substrate. This may reduce, for example, a signal of a high frequency band (e.g., about 6 GHz to about 60 GHz) used for 5G network communication is lost (e.g., attenuated) by a transmission line. As a result, the UE (100) may improve the quality or speed of communication with the second cellular network ($94) (e.g., a 5G network).

Consider, the antenna ($48) may be formed of an antenna array including a plurality of antenna elements that may be used for beam forming. In this case, the third RFIC ($26) may include, for example, a plurality of phase shifters ($38) corresponding to a plurality of antenna elements, as part of the third RFFE ($36). At the time of transmission, each of the plurality of phase converters ($38) may convert the phase of the 5G conveve6 RF signal to be transmitted to the outside of the UE (100) (e.g., a base station of the 5G network) through a corresponding antenna element. At reception, each of the plurality of phase converters ($38) may convert the phase of the 5G conveve6 RF signal received from the outside into the same or substantially the same phase through a corresponding antenna element, which enables the transmission or the reception through the beam forming between the UE (100) and the above external.

The second cellular network ($94) (e.g., a 5G network) may be operated independently of the first cellular network ($92) (e.g., a legacy network) (e.g., Stand-Alone (SA)), connected and operated (e.g., Non-Stand Alone (NSA)). For example, the 5G network may have only an access network (e.g., a 5G radio access network (RAN) or a next generation RAN (NG RAN)), and may not have a core network (e.g., a next generation core (NGC)). In this case, the UE (100) may access an external network (e.g., the Internet) under control of a core network (e.g., a evolved core (EPC)) of the legacy network after accessing the access network of the 5G network. Protocol information (e.g., LTE protocol information) for communication with legacy networks or protocol information (e.g., New Radio (NR) protocol information for communication with 5G networks) may be stored in memory (150) and accessed by other parts (e.g., processor (160), first communication processor ($12), or second communication processor ($14).

In the invention when the RAT on both the first SIM (110) and the second SIM (120) is Idle, the first SIM (110) which is not supporting the 5G services will be using the RFIC $22 to monitor the paging.

Similarly, if the second SIM (120) which supports the 5G services with the dual registration mode is also idle, then the second SIM (120) will be using the RFIC $24 to monitor the paging if the 5G attached is Sub-6. If the 5G attached is mm wave, then the 5G attached will use the RFIC ($26) to monitor the paging.

In case of connected mode on the first SIM (110), then the first SIM (110) will use the RFIC ($22) to transmit and receive the data. At this time if the 4G is used on the second SIM (120), then the second SIM (120) will be using the RFIC ($24) to transmit and receive the data.

In case the 5G is used on the second SIM (120), then the second SIM (120) will be using the RFIC ($24) to transmit and receive the data if the frequency of the 5G is below 6 GHz. If the frequency is above 6 GHz, then the second SIM (120) will use the RFIC ($26) to transmit and receive the data.

Figure 4A:
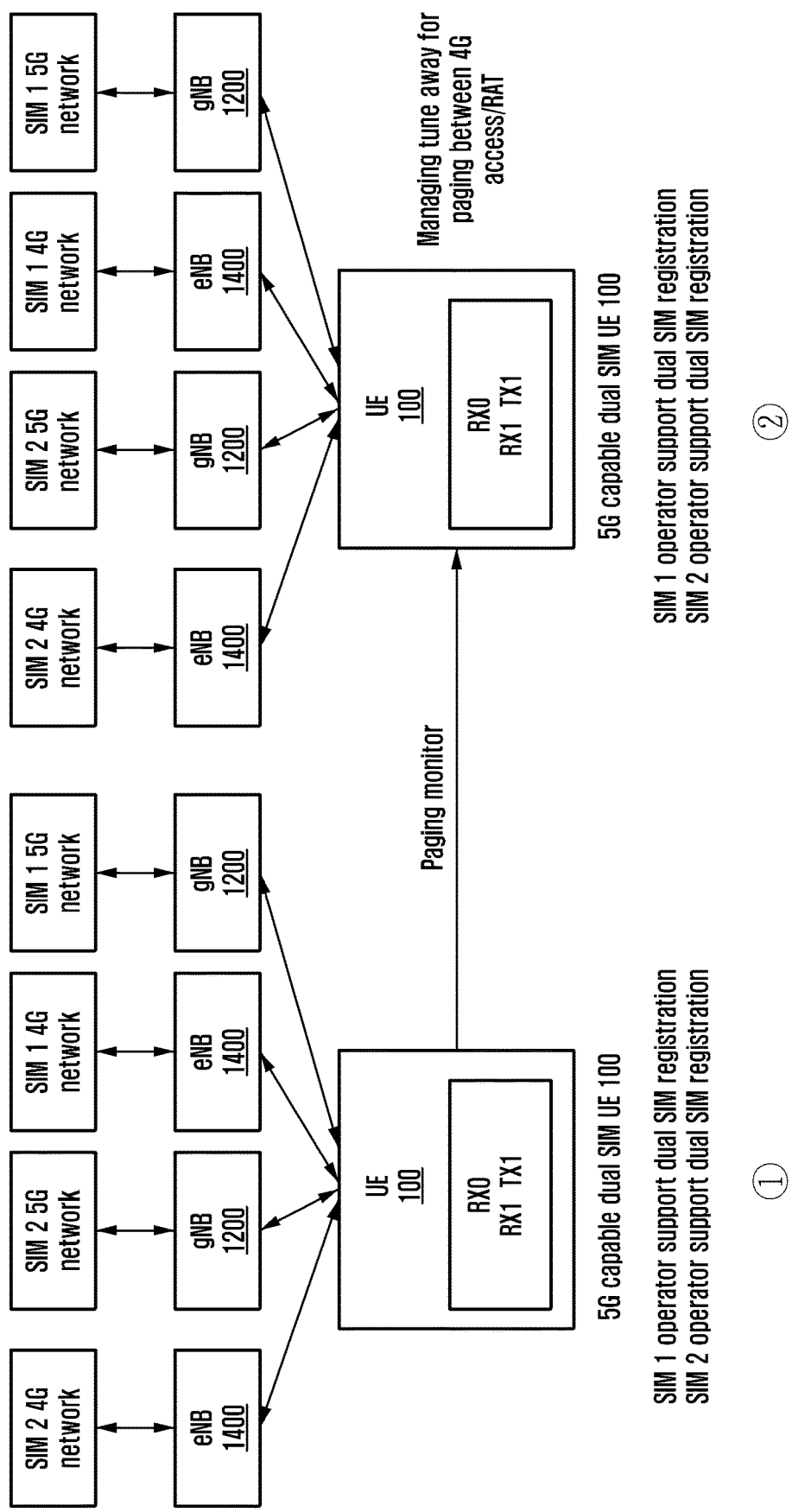
FIG. 4A illustrates a conventional mechanism for handling paging operations for the UE which is dual SIM capable with the single transceiver, according to a prior art.

FIG. 4A illustrates a conventional mechanism for handling paging operations for the UE (100) which is dual SIM capable with the single transceiver, according to a prior art.

Referring to the FIG. 4A, at 1, consider the UE (100) which is dual SIM capable with a single transceiver. The first SIM (110) and the second SIM (120) both support dual registration. Due to the dual registration capability on both the first SIM (110) and the second SIM (120), the UE (100) may have to handle a total of 4 paging operations i.e., two paging operations on the first SIM (110) and two paging operations on the second SIM (120). At 2, the reading of 4 paging operations on the single transceiver may lead to 40% power consumption in the idle mode.

Figure 4B:
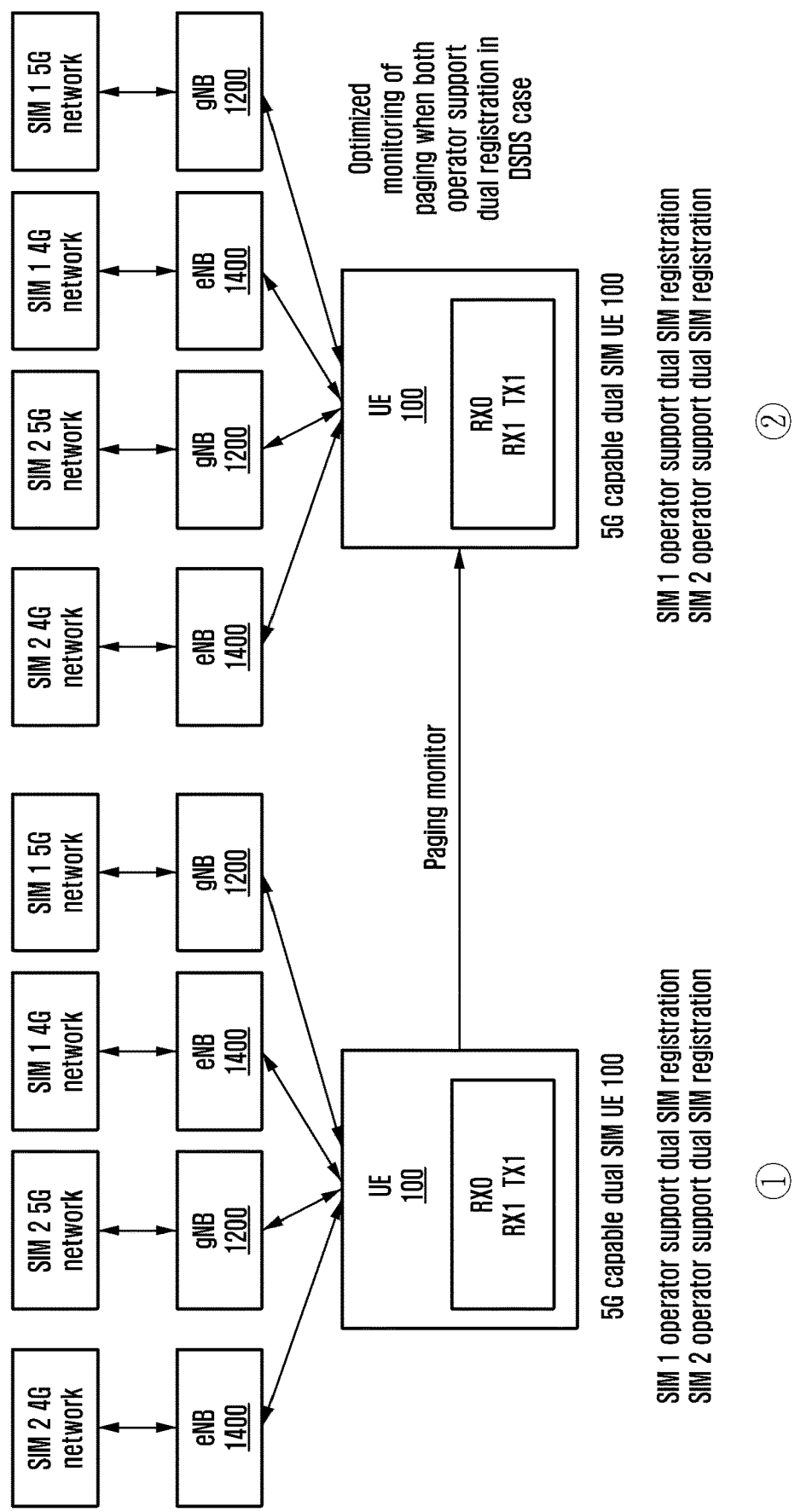
FIG. 4B illustrates a method for optimizing power consumption by handling paging operations for the UE which is dual SIM capable with a single transceiver, according to an embodiment as disclosed herein.

FIG. 4B illustrates a method for optimizing power consumption by handling paging operations for the UE (100) which is dual SIM capable with the single transceiver, according to an embodiment as disclosed herein.

Referring to the FIG. 4B, in conjunction with the FIG. 4A, the proposed method optimizes the power consumption and reduce the power consumption by 20% by handling paging operations for the UE (100) which is dual SIM capable with the single transceiver.

In one embodiment, the UE (100) operates one of the first SIM (110) and the second SIM (120) in the dual registration mode and the other SIM in the single registration mode to reduce the number of paging messages. The UE (100) may determine the SIM to be operated in the dual registration mode based on the SIM on which the mobile data is set, the SIM on which the VoLTE only is supported and the VoNR is not supported, the SIM on which the critical 5G services are required, etc.

In another embodiment, the UE (100) operates both the first SIM (110) and the second SIM (120) in the single registration mode to reduce the number of paging messages, as the UE (100) needs to monitor paging for only two RATs thus reducing the idle mode power consumption by 20%.

Figure 4C:
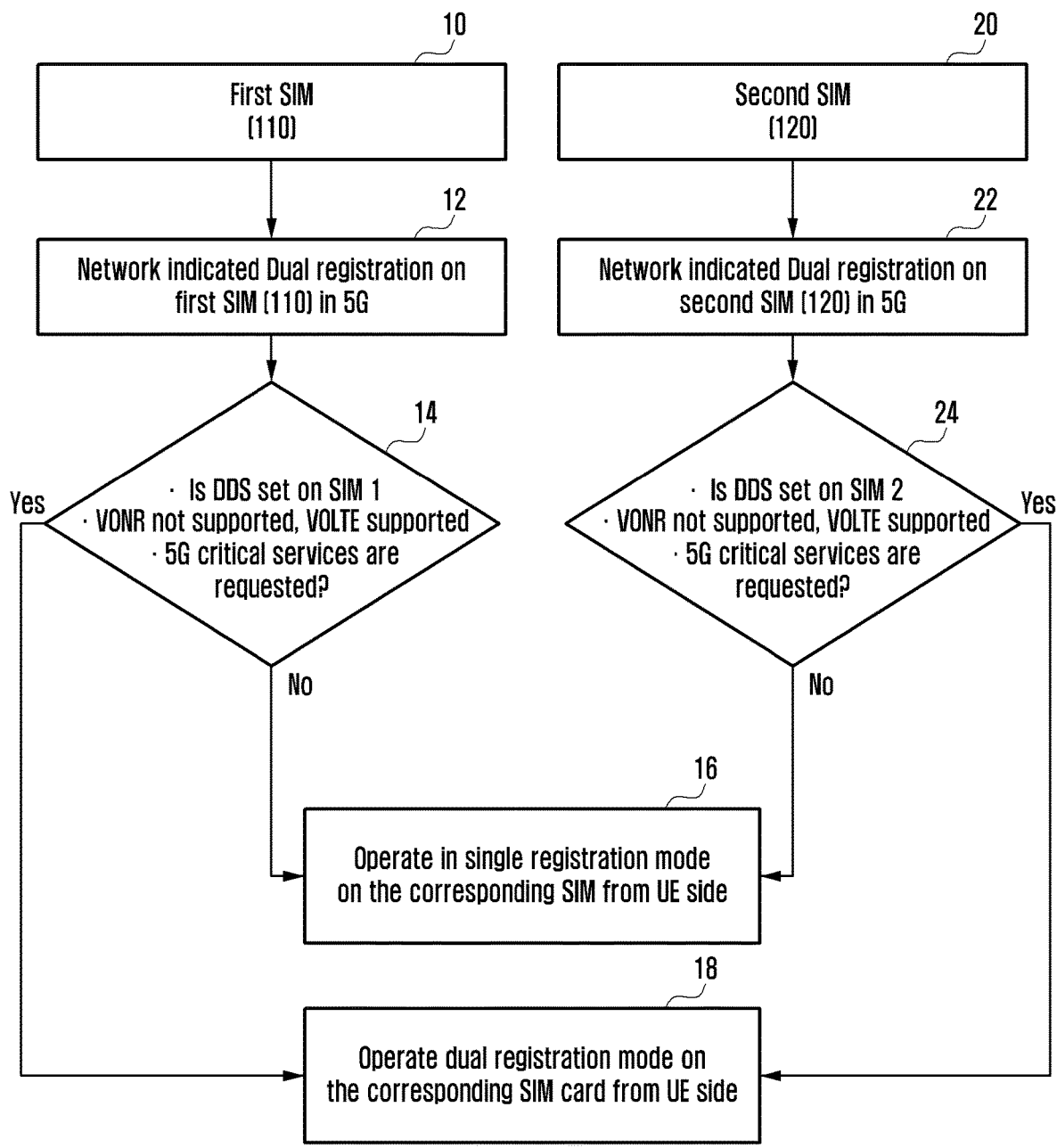
FIG. 4C illustrates a method for operating one of the first SIM and the second SIM in the dual registration mode when the event is associated with the first SIM, according to an embodiment as disclosed herein.

FIG. 4C illustrates a method for operating one of the first SIM (110) and the second SIM (120) in the dual registration mode when the event is associated with the first SIM (110), according to an embodiment as disclosed herein.

Referring to the FIG. 4C, at step 10, the UE (100) considers the first SIM (110) and determines whether the first SIM (110) supports the dual registration mode on the 5G network, at step 12. At step 14, the UE (100) determines whether at least one of the DDS is set on the first SIM (110), the first SIM (110) does not support the VONR, the first SIM (110) supports the VOLTE and the 5G critical services are requested in the first SIM (110).

In response to determining that the at least one of the DDS is set on the first SIM (110), the first SIM (110) does not support the VONR, the first SIM (110) supports the VOLTE and the 5G critical services are requested in the first SIM (110) is valid for the first SIM (110), at step 18, the UE (100) operates the first SIM (110) in the dual registration mode and the second SIM (120) on the single registration mode.

In response to determining that the at least one of the DDS is set on the first SIM (110), the first SIM (110) does not support the VONR, the first SIM (110) supports the VOLTE and the 5G critical services are requested in the first SIM (110) is not valid for the first SIM (110), at step 16, the UE (100) operates the first SIM (110) in the single registration mode and the second SIM (120) on the dual registration mode.

Similarly, the UE (100) at step 20 to step 24 determines whether the second SIM (120) is to be operated in one of the dual registration mode and the single registration mode.

Figure 4D:
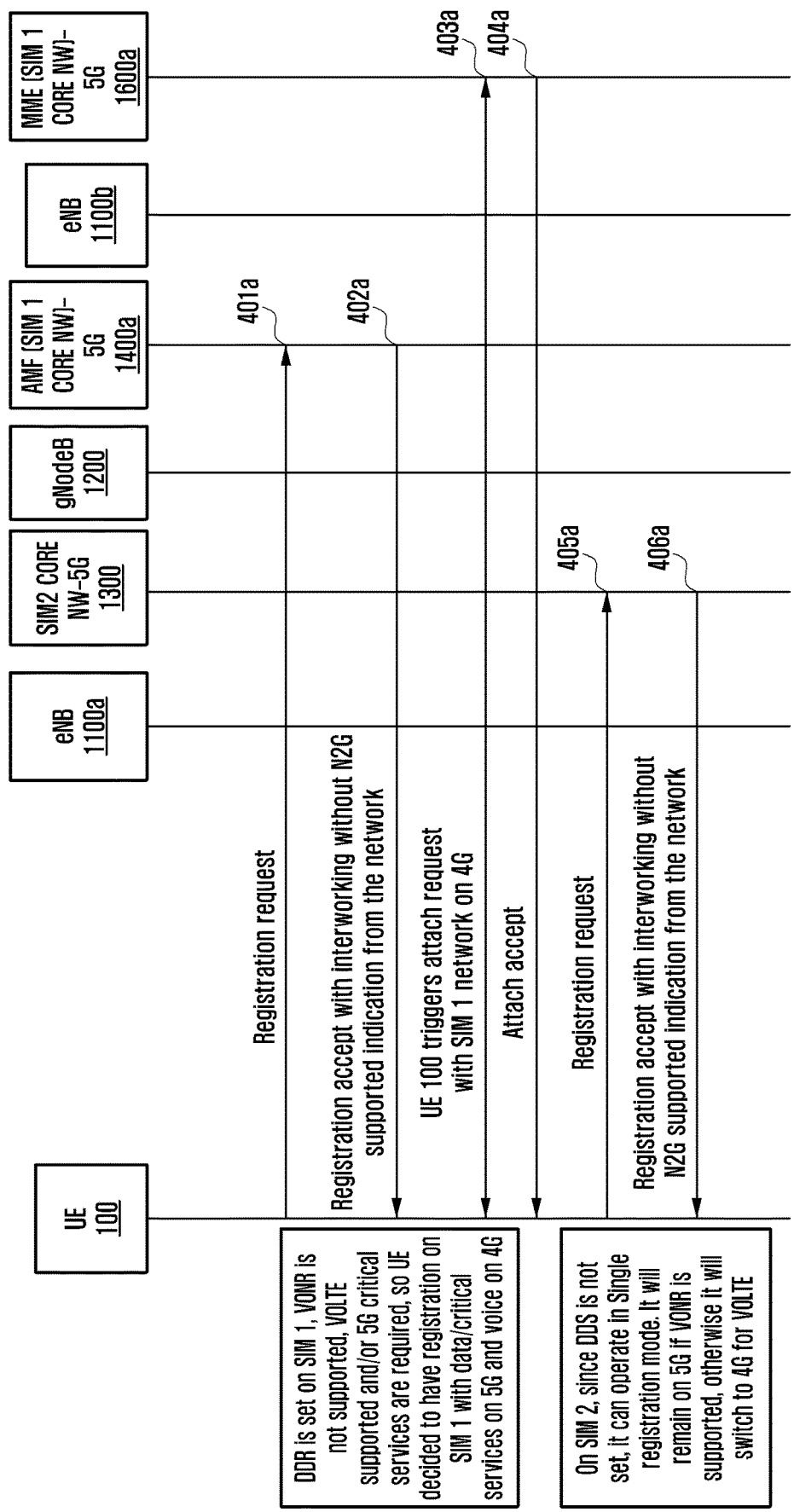
FIG. 4D illustrates a method for optimizing power consumption by handling paging operations for the UE which is dual SIM capable with the single transceiver, according to an embodiment as disclosed herein.

FIG. 4D illustrates a method for optimizing power consumption by handling paging operations for the UE (100) which is dual SIM capable with the single transceiver, according to an embodiment as disclosed herein.

Referring to the FIG. 4D, consider the UE (100) which is a DSDS Device with single radio and dual registration capability on both the first SIM (110) and the second SIM (120).

At step 401a, the UE (100) registers to the core network of the first SIM (110). The UE (100) registers to the core network of the first SIM (110) by sending the attach request which indicates that a dual registration is set on the first SIM (110). Further, the decision to select the SIM in which the dual registration is enabled is based on parameters are at least one of the SIM on which the VONR is not supported, the SIM on which the VOLTE is supported and the 5G critical services are required on the SIM.

Therefore, consider that the UE (100) registers on the first SIM (110) on the dual registration mode with the data/critical services on the 5G and the voice on the 4G.

At step 402a, the AMF (first SIM (110) CORE NW)-5G (1400a) responds by sending a registration accept message with interworking without a N2G supported indication from the core network of the first SIM (110). At step 403a, the UE 100 triggers the attach request with the first SIM (110) network on the 4G and receives the attach accept message from the MME (first SIM (110) CORE NW)-5G 1600a, at step 404a.

At step 405a, the UE (100) sends the registration request from the second SIM (120). Since, the DDS is not set on the second SIM (120), the second SIM (120) can operate only in the single registration mode. Further, the second SIM (120) will remain on the 5G if the VONR is supported, otherwise the second SIM (120) will switch to the 4G for the VOLTE.

At step 406a, the UE (100) receives the registration accept message with interworking without the N2G supported indication from the network. Thus, in the proposed method the first SIM (110) will be operating in the dual registration mode and the second SIM (120) will operate in the single registration mode, which will reduce the number of the paging operations to be monitored by the UE (100).

Figure 4E:
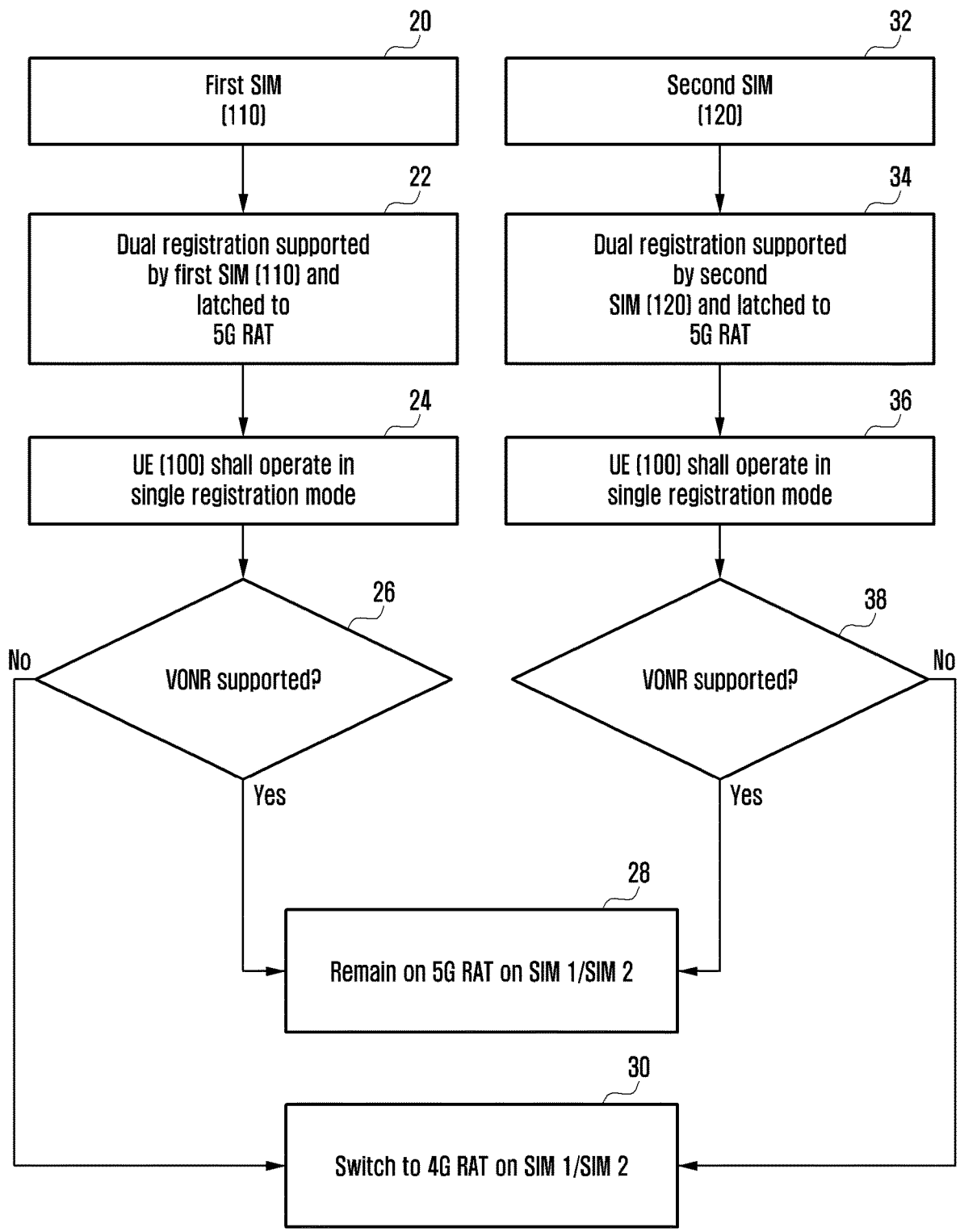
FIG. 4E illustrates a method for operating both the first SIM and the second SIM in the single registration for optimizing resources of the wireless communication network, according to an embodiment as disclosed herein.

FIG. 4E illustrates a method for operating both the first SIM (110) and the second SIM (120) in the single registration for optimizing resources of the wireless communication network, according to an embodiment as disclosed herein.

Referring to the FIG. 4E, at step 20, the UE (100) considers the first SIM (110) and determines that the first SIM (110) supports dual registration and is currently latches to the 5G RAT, at step 22. Further, at step 24, the UE (100) configures the first SIM (110) to operate in the single registration mode. Further, at step 26, the UE (100) determines whether the VONR is supported on the first SIM (110). In response to determining that the VONR is supported on the first SIM (110), at step 28, the UE (100) continues to operate the first SIM (110) on the 5G RAT. In response to determining that the VONR is supported on the first SIM (110), at step 30, the UE (100) switches to the 4G RAT and operates the first SIM (110) on the 4G RAT.

Similarly, the UE (100) repeats the procedure mentioned from step 20 to step 30, for the second SIM (120) and configures the second SIM (120) to operate in the single registration mode.

Figure 4F:
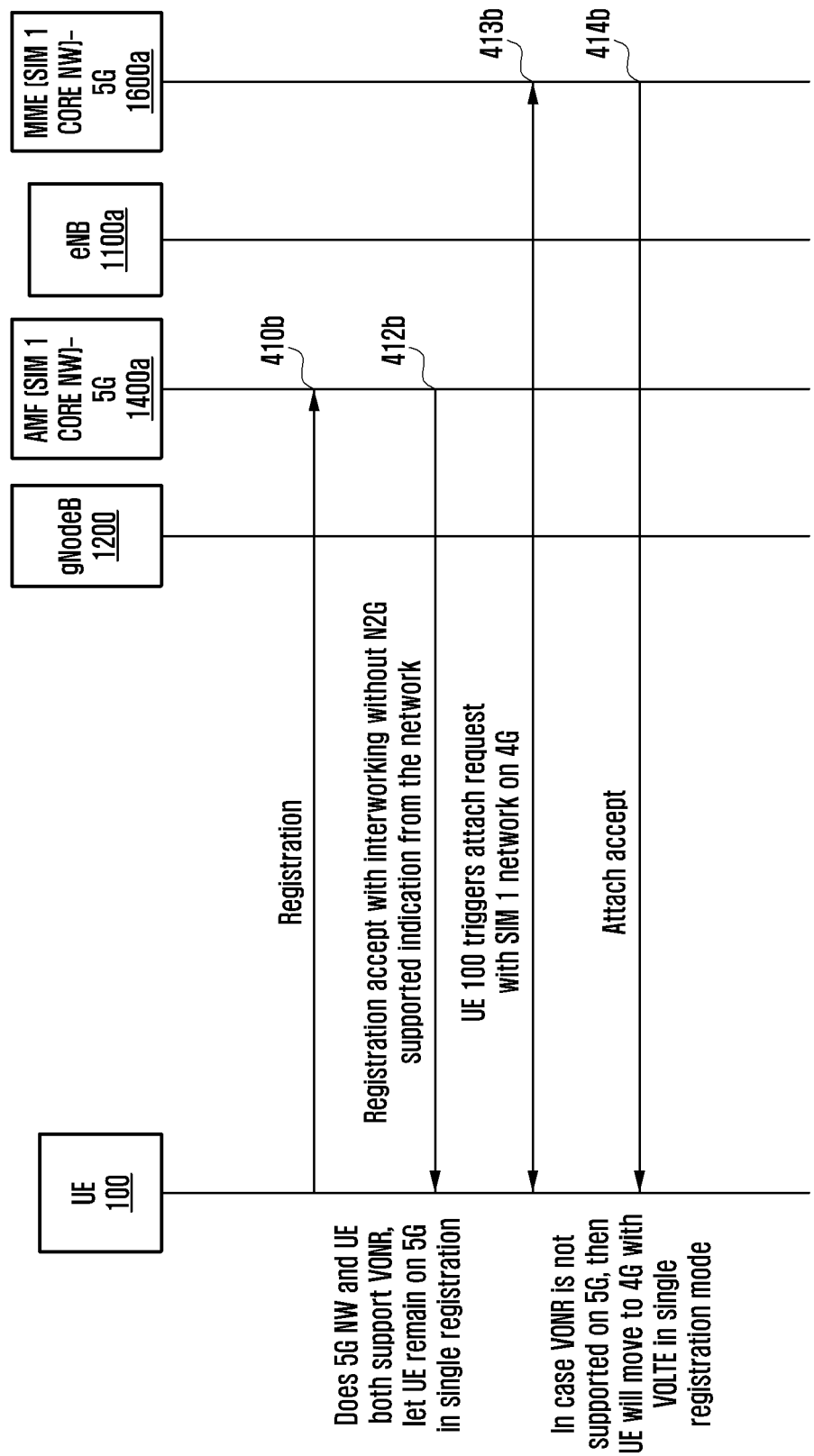
FIG. 4F is a signaling diagram which illustrates a method for optimizing power consumption by handling paging operations for the UE by operating the first SIM in the single registration mode, according to an embodiment as disclosed herein.

FIG. 4F is a signaling diagram which illustrates a method for optimizing power consumption by handling paging operations for the UE (100) by operating the first SIM (110) in the single registration mode, according to an embodiment as disclosed herein.

Referring to the FIG. 4F, consider the UE (100) which is a DSDS Device with single radio and dual registration capability on both the first SIM (110) and the second SIM (120).

At step 410b, the UE (100) registers to the core network of the first SIM (110). The UE (100) registers to the core network of the first SIM (110) with 5G capability by sending the attach request which indicates that a single registration is set on the first SIM (110). Further, at step 412b, the UE (100) receives the registration accept message with inter-working without the N2G supported indication from the network of the first SIM (110). The UE (100) determines whether the 5G RAT supports the VONR. In response to determining that the 5G network supports the VONR, the UE (100) continues to operate the first SIM (110) on the 5G network in the single registration mode. In response to determining that the 5G RAT does not support the VONR, the UE (100) switches to the 4G RAT with the VOLTE in the single registration mode by triggering the attach request with the first SIM (110) on the 4G RAT, at step 414b. Further, the UE (100) receives the attach accept response from the 4G RAT, at step 416b.

Figure 4G:
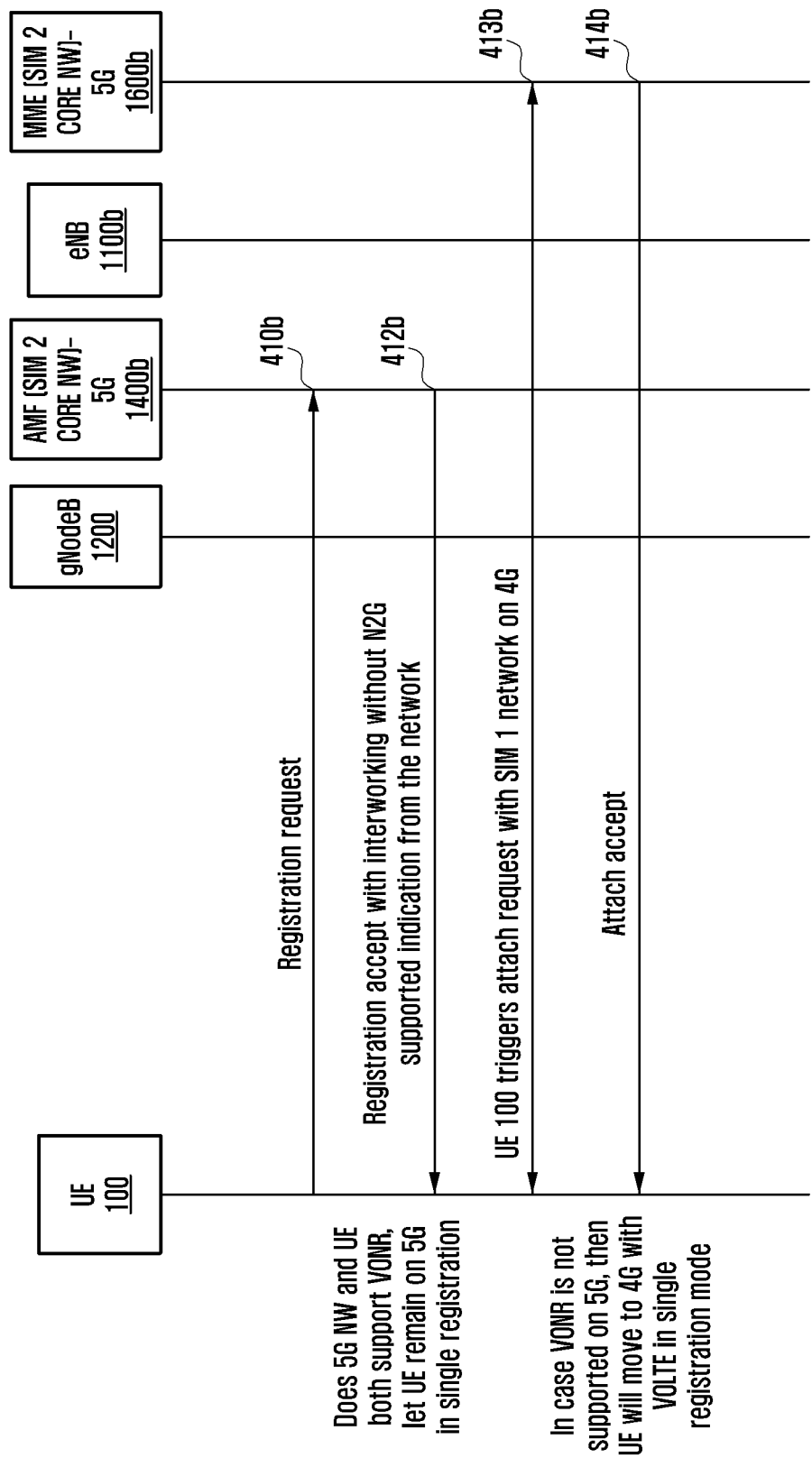
FIG. 4G is a signaling diagram which illustrates a method for optimizing power consumption by handling paging operations for the UE by operating the second SIM in the single registration mode, according to an embodiment as disclosed herein.

FIG. 4G is a signaling diagram which illustrates a method for optimizing power consumption by handling paging operations for the UE (100) by operating the second SIM (120) in the single registration mode, according to an embodiment as disclosed herein.

Referring to the FIG. 4G, consider the UE (100) which is a DSDS Device with single radio and dual registration capability on both the first SIM (110) and the second SIM (120).

At step 410c, the UE (100) registers to the core network of the second SIM (120). The UE (100) registers to the core network of the second SIM (120) with 5G capability by sending the attach request which indicates that a single registration is set on the second SIM (120) Further, at step 412c, the UE (100) receives the registration accept message with interworking without the N2G supported indication from the network of the second SIM (120) The UE (100) determines whether the 5G RAT supports the VONR. In response to determining that the 5G network supports the VONR, the UE (100) continues to operate the second SIM (120) on the 5G network in the single registration mode. In response to determining that the 5G RAT does not support the VONR, the UE (100) switches to the 4G RAT with the VOLTE in the single registration mode by triggering the attach request with the second SIM (120) on the 4G RAT, at step 414c. Further, the UE (100) receives the attach accept response from the 4G RAT, at step 416c.

Therefore, based on the FIG. 4F and the FIG. 4G, the UE (100) retains the registration of the first SIM (110) and the second SIM (120) only on that RAT which supports voice which is determined by the UE (100) based on a "IMS" PDU/PDN, which is indicated in the Table. 1.

TABLE 1

| First SIM (110) | Second SIM (120) | Operating RAT |
| --- | --- | --- |
| VOLTE | VOLTE | First SIM (110)-4G RAT |
|  |  | Second SIM (120) -4G RAT |
| VOLTE | VONR | First SIM (110) -4G RAT |
|  |  | Second SIM (120) -5G RAT |
| VONR | VOLTE | First SIM (110) -5G RAT |
|  |  | Second SIM (120) -4G RAT |
| VONR | VONR | First SIM (110) -5G RAT |
|  |  | Second SIM (120) -5G RAT |

Figure 5A:
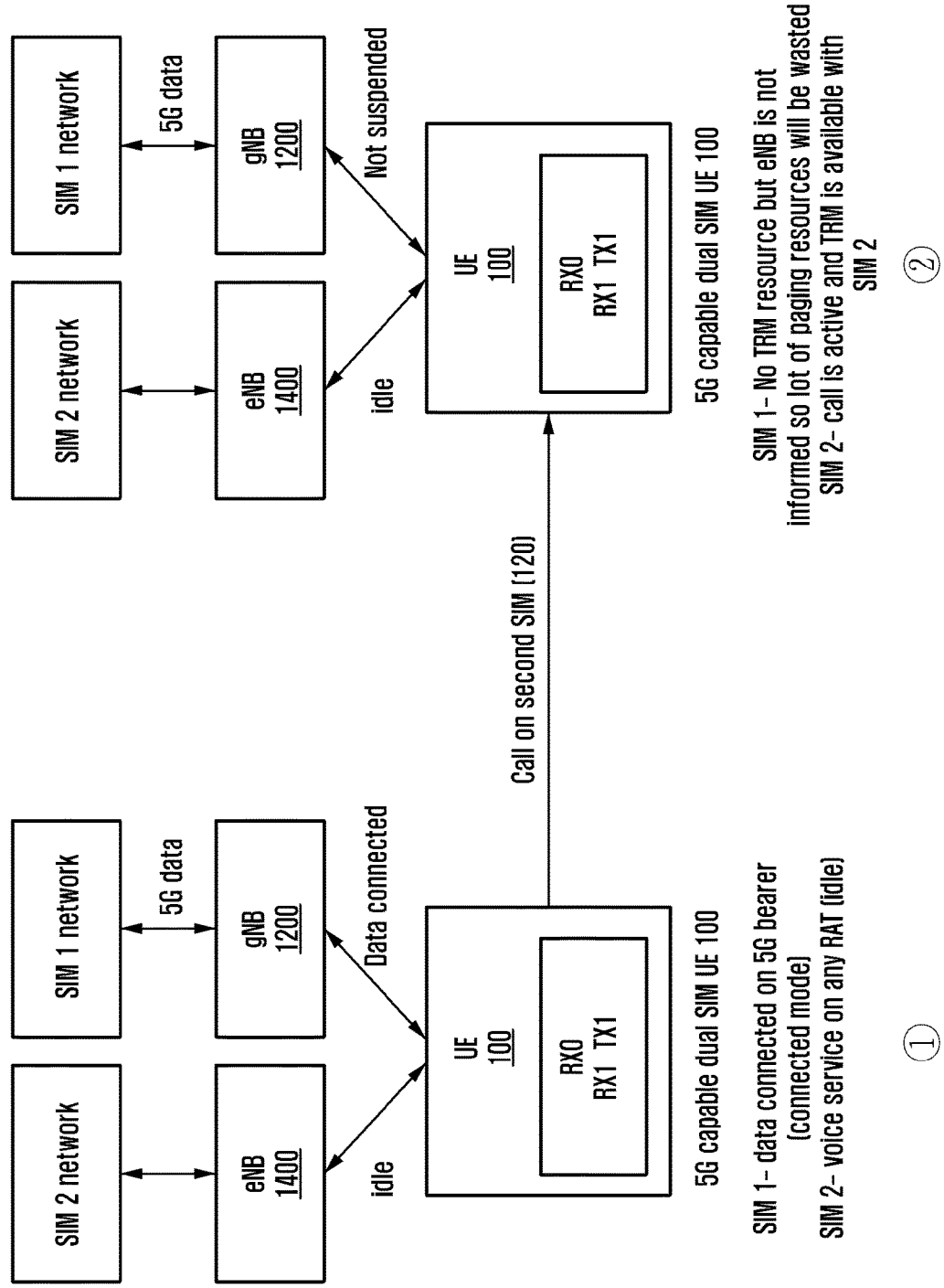
FIG. 5A illustrates a scenario of MO/MT call on one SIM leading to loss of resources of the wireless communication network due to paging on another SIM, according to the prior art.

FIG. 5A illustrates a scenario of MO/MT call on one SIM leading to loss of resources of the wireless communication network due to paging on the other SIM, according to the prior art.

Referring to the FIG. 5A, consider the UE (100) which is a DSDS Device with single radio and dual registration capability on both the first SIM (110) and the second SIM (120).

At 1, the first SIM (110) is configured to provide data service on the 5G bearer and is in the connected mode, also the second SIM (120) is configured to provide voice service on any RAT and is in the idle mode.

At 2, consider that the UE (100) receives a mobile terminated (MT) call or initiates a mobile originated (MO) call. The first SIM (110) does not have any TRM resource but the eNB (1400) is not informed of the MO/MT call on the second SIM (120) which is occupied the transceiver. Hence, a lot of paging resources are wasted on the network side. The second SIM (120) is active due to the MO/MT call and the transceiver is occupied by the second SIM (120). Therefore, there is no existing method for the UE (100) to suspend the operations on the first SIM (110) when there is an ongoing MO/MT call on the second SIM (120) and then resume the operations after the MO/MT call ends.

Figure 5B:
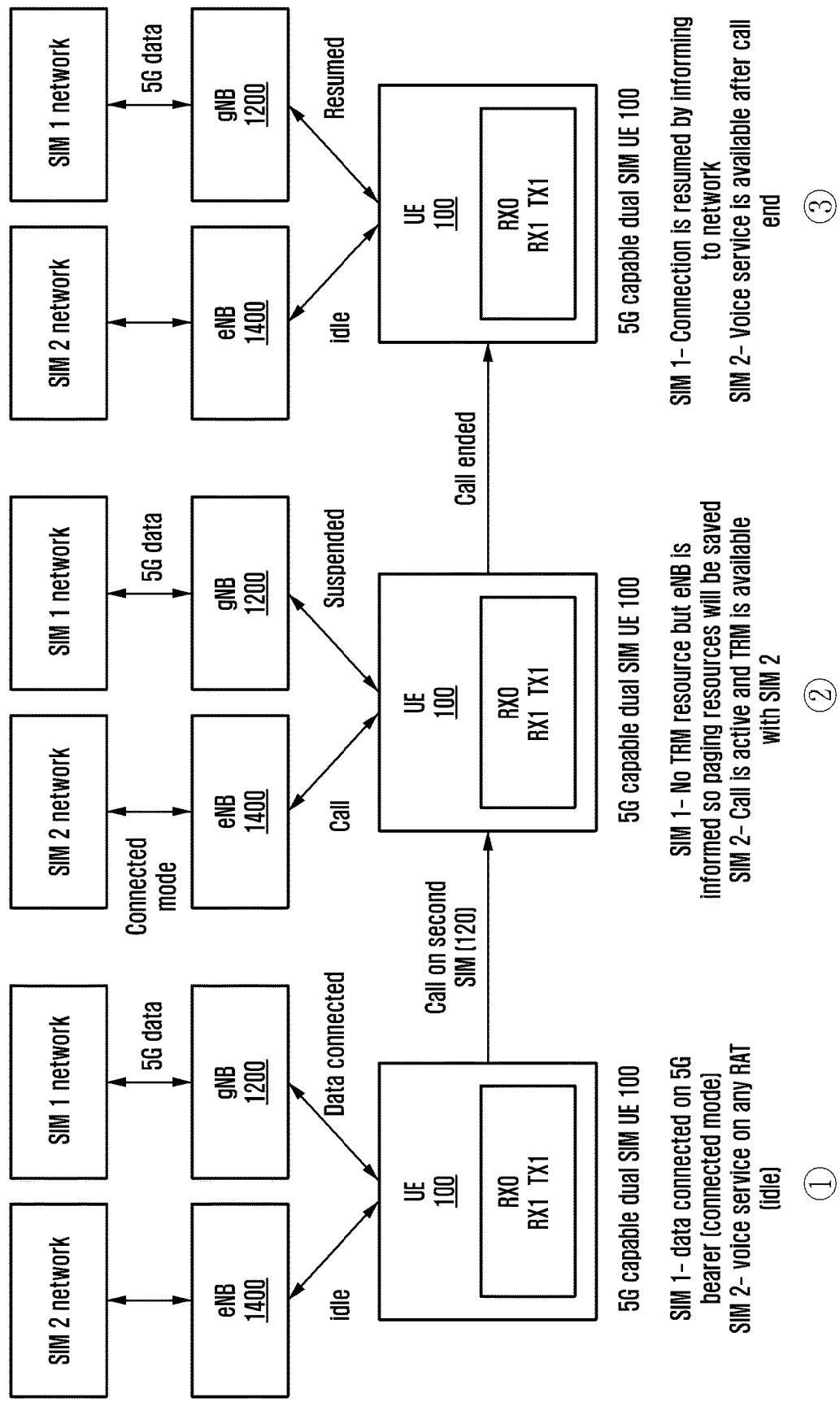
FIG. 5B illustrates a method of optimizing the resources when the MO/MT call is ongoing on one SIM of the dual SIM UE, according to an embodiment as disclosed herein.

FIG. 5B illustrates a method of optimizing the resources when the MO/MT call is ongoing on one SIM of the dual SIM UE (100), according to an embodiment as disclosed herein.

Referring to the FIG. 5B, in conjunction with the FIG. 5A, at step 2, when the MO/MT call is ongoing on the second SIM (120), the UE (100) indicates to the eNB (1400) that the first SIM (110) is not occupying the transceiver and hence no paging needs to be done on the first SIM (110). Due to the UE (100) informing the eNB (1400) about the first SIM (110) being idle, the paging resources are saved as the eNB (1400) suspends the data connectivity on the first SIM (110), thereby optimizing the power and paging resources at the wireless communication network.

Further, at 3, the UE (100) determines that the MO/MT call is ended on the second SIM (120) and indicates the wireless communication network to resume the data connectivity with the first SIM (110). Also, the voice service is available at the second SIM (120) even after the MO/MT call has ended.

Figure 5C:
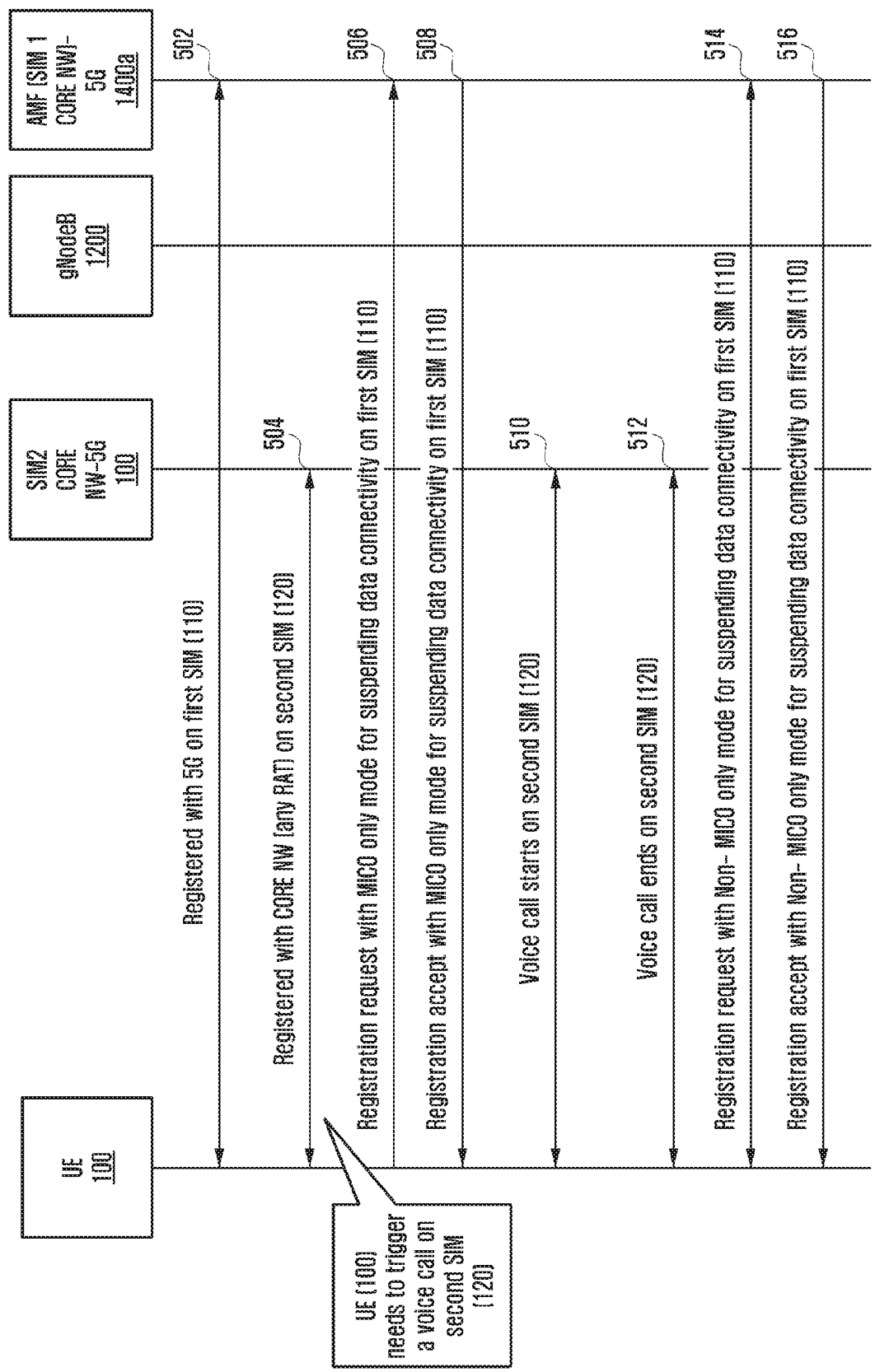
FIG. 5C is a signaling diagram which illustrates a method for optimizing the resources of the wireless communication network by suspending and resuming the downlink data when the event is associated with the second SIM, according to an embodiment as disclosed herein.

FIG. 5C is a signaling diagram which illustrates a method for optimizing the resources of the wireless communication network by suspending and resuming the downlink data when the event is associated with the second SIM (120), according to an embodiment as disclosed herein.

Referring to the FIG. 5C, consider the UE (100) which is a DSDS Device with single radio and dual registration capability on both the first SIM (110) and the second SIM (120).

At step 502, the UE (100) registers with the 5G RAT on the first SIM (110) and at step 504, the UE (100) registers with the core network using one of the 5G RAT and the 4G RAT on the second SIM (120). At step 506, consider that the UE (100) needs to trigger the voice call on the second SIM (120) and the UE (100) determines that the downlink data is operating on the first SIM (110). In response to determining that the downlink data is operating on the first SIM (110), the UE (100) sends a registration request with a mobile initiated connection only (MICO) mode on the first SIM (110) to the 5G RAT for suspending the downlink data on the first SIM (110). Further, the UE (100) receives the registration accept with MICO mode from the 5G RAT, at step 508.

At step 510, the UE (100) initiates the voice call on the second SIM (120) and monitors the voice call. At step 512, the UE (100) determines that the voice call on the second SIM (120) is ended. In response to determining that the voice call on the second SIM (120) is ended, at step 514, the UE (100) sends a registration request with a non-mobile initiated connection only (non-MICO) mode on the first SIM (110) to the 5G RAT for resuming the downlink data on the first SIM (110). Further, the UE (100) receives the registration accept with non-MICO mode from the 5G RAT, at step 516.

In another embodiment, during the suspension of the downlink data on the first SIM (110) a dual smart SIM feature can be enabled so that any MT calls coming to the first SIM (110) are not lost and can be received on the second SIM (120).

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for processing resources of a wireless communication network in a user equipment (UE) while providing fifth generation (5G) services, comprising:
   registering a first subscriber identity module (SIM) of the UE to a 5G radio access technology (RAT);
   registering a second SIM to at least one of the 5G RAT and a fourth generation (4G) RAT;
   detecting an event associated with one of the first SIM and the second SIM;
   when the UE operates with at least two transceivers and the first SIM and the second SIM occupy a first transceiver among the at least two transceivers, managing an operation of the first transceiver associated with the second SIM based on the event associated with the first SIM; and
   in case thatwhen the UE has operates with a single transceiver, suspending a downlink data connectivity associated with the first SIM based on the event associated with the second SIM.

2. The method of claim 1, wherein managing the operation of the first transceiver associated with the second SIM based on the event associated with the first SIM comprises:
   detecting the event on the first SIM;
   registering to a network using the first SIM on the first transceiver based on the event, wherein the UE is registered to the 4G RAT in a dual registration mode with dual radio on the first transceiver of the second SIM and the 5G network on a second transceiver of the second SIM; and selecting one of the 4G RAT and the 5G RAT to occupy the second transceiver by the second SIM in response to detecting the event associated with the first SIM.

3. The method of claim 2, wherein selecting one of the 4G RAT and the 5G RAT to occupy the second transceiver when the first SIM is occupying the first transceiver comprises:
   determining the weighted score for the 4G RAT;
   determining the weighted score for the 5G RAT;
   comparing the weighted score for the 4G RAT and the weighted score for the 5G RAT;
   selecting the 5G RAT to occupy the second transceiver in response to determining that the weighted score for the 5G RAT is greater than the weighted score for the 4G RAT; and
   selecting the 4G RAT to occupy the second transceiver in response to determining that the weighted score for the 4G RAT is greater than the weighted score for the 5G RAT.

4. The method of claim 3, wherein selecting the 5G RAT to occupy the second transceiver in response to determining that the weighted score for the 5G RAT is greater than the weighted score for the 4G RAT further comprising:
   determining the 5G RAT is selected to occupy the second transceiver;
   performing one of establishing a protocol data unit (PDU) session between the UE and the 5G RAT by handing over the PDU sessions from the 4G RAT to the 5G RAT or suspending the PDU sessions on the 4G RAT;
   determining the event on the first SIM is ended, wherein the event is a voice call; and
   performing one of handing-over the PDU sessions from the 5G RAT to the 4G RAT or resuming the PDU sessions of 4G RAT which was suspended.

5. The method of claim 3, wherein selecting the 4G RAT to occupy the second transceiver in response to determining that the weighted score for the 4G RAT is greater than the weighted score for the 5G RAT further comprises:
   determining the 4G RAT is selected to occupy the second transceiver;
   performing one of establishing PDU sessions between the UE and the 4G RAT by handing over the PDU sessions from the 5G RAT to the 4G RAT or suspending the PDU sessions of the 4G RAT associated with the first transceiver;
   determining the event on the first SIM is ended, wherein the event is a voice call; and
   performing one of handing-over the PDU sessions from the 4G RAT to the 5G RAT or resuming the PDU sessions of the 4G RAT which was suspended.

6. The method of claim 2, wherein the weighted score for the 4G RAT and 5G RAT is determined based on a plurality of parameters, and wherein the plurality of parameters are at least one of voice availability for paging, a second transceiver radio frequency (RF) chain availability during a voice call on the first transceiver, a RAT interference, transmission power level, coverage of the 4G RAT, coverage of the 5G RAT, a user subscription, a home area, a roaming area, active PDU preference, quality of service (QOS) requirement, predicted data rate of the 4G RAT, predicted data rate of the 5G RAT, determined data rate of the 4G RAT and determined data rate of the 5G RAT, operator preferences and user preferences.

7. The method of claim 1, wherein the managing an operation of the first transceiver associated with the second SIM based on the event associated with the second SIM comprises:
   detecting the event on the first SIM, wherein the event is a voice call;
   registering to a network of any technology using the first SIM on the first transceiver based on the event, wherein the UE is registered to the 4G RAT in a dual registration mode with dual radio on the first transceiver on the second SIM and the 5G network on the first SIM on a second transceiver;
   determining a high interference with the event on the first transceiver; and
   suspending the PDU sessions of the 4G RAT and the 5G RAT associated with the second SIM.

8. The method of claim 1, wherein suspending the data connectivity associated with the first SIM based on the event of the second SIM comprises:
   detecting the event of the second SIM when the first SIM_ is connected with the 5G RAT, wherein the event is a voice call;
   suspending the data connectivity on the first SIM by sending a registration request with a mobile initiated communication only (MICO) mode on the first SIM to the 5G network, wherein the MICO mode suspends the data connectivity on the first SIM;
   initiating the voice call on the second SIM of the UE;
   determining that the voice call on the second SIM has ended; and
   resuming the data connectivity on the first SIM by sending a registration request with a non-MICO mode on the first SIM to the 5G network, wherein the non-MICO mode resumes the data connectivity on the first SIM.

9. The method of claim 2, wherein managing the operation further comprises:
   sending a non-access stratum (NAS) message to suspend the 4G RAT or the 5G RAT to the second SIM.

10. The method of claim 8, further comprising:
    enabling a dual smart SIM feature to receive the voice call directed towards the first SIM on the second SIM when the data connectivity is suspended on the first SIM.

11. A user equipment (UE) for processing resources of a wireless communication network while providing fifth generation (5G) services, comprising:
    a memory;
    a processor coupled to the memory and configured to:
       register a first subscriber identity module (SIM) of the UE to a 5G radio access technology (RAT);
       register a second SIM to at least one of the 5G RAT and a fourth generation (4G) RAT;
       detect an event associated with one of the first SIM and the second SIM;
       when the UE operates with at least two transceivers and the first SIM and the second SIM occupy a first transceiver among the at least two transceivers, manage an operation of the first transceiver associated with the second SIM based on the event of at the first SIM; and when the UE operates with a single transceiver, suspend a data connectivity associated with the first SIM based on the event of the second SIM.

12. The UE of claim 11, wherein the processor is configured to:
    optimize the resources of
       detect the event on the first SIM,
       register to a network using the first SIM on the first transceiver based on the event, wherein the UE is registered to the 4G RAT in a dual registration mode with dual radio on the first transceiver of the second SIM and the 5G network on a second transceiver of the second SIM, and
       select one of the 4G RAT and the 5G RAT to occupy the second transceiver by the second SIM in response to detecting the event on the first SIM.

13. The UE of claim 12, wherein the processor is configured to:
    determine the weighted score for the 4G RAT,
    determine the weighted score for the 5G RAT,
    compare the weighted score for the 4G RAT and the weighted score for the 5G RAT,
    select the 5G RAT to occupy the second transceiver in response to determining that the weighted score for the 5G RAT is greater than the weighted score for the 4G RAT, and
    select the 4G RAT to occupy the second transceiver in response to determining that the weighted score for the 4G RAT is greater than the weighted score for the 5G RAT.

14. The UE of claim 13, wherein the processor is configured to:
    determine the 5G RAT is selected to occupy the second transceiver;
    perform one of establishing protocol data unit (PDU) sessions between the UE and the 5G RAT by handing over the PDU sessions from the 4G RAT to the 5G RAT or suspending the PDU sessions on 4G RAT,
    determine the event on the first SIM is ended, wherein the event is a voice call, and
    perform one of handing-over the PDU sessions from the 4G RAT to the 5G RAT or resuming the PDU sessions of 4G RAT which was suspended.

15. The UE of claim 13, wherein the processor is configured to
    determine the 4G RAT is selected to occupy the second transceiver;
    perform one of establishing protocol data unit (PDU) sessions between the UE and the 4G RAT by handing over PDU sessions from the 5G RAT to the 4G RAT or suspending the PDU sessions on the 4G RAT associated with the first transceiver;
    determine the event on the first SIM is ended, wherein the event is a voice call; and
    perform one of handing-over the PDU sessions from the 4G RAT to the 5G RAT or resuming the PDU sessions on the 4G RAT.

16. The UE of claim 12, wherein the processor is configured to determine the weighted score for the 4G RAT and 5G RAT based on a plurality of parameters, and
    wherein the plurality of parameters are at least one of voice availability for paging, the second transceiver radio frequency (RF) chain availability during a voice call on the first transceiver, a RAT interference, transmission power level, coverage of the 4G RAT, coverage of the 5G RAT, a user subscription, a home area, a roaming area, active PDU preference, quality of service (QOS) requirement, predicted data rate of the 4G RAT, predicted data rate of the 5G RAT, determined data rate of the 4G RAT and determined data rate of the 5G RAT, operator preferences and user preferences.

17. The UE of claim 12, wherein the processor is configured to send a non-access stratum (NAS) message to suspend the 4G RAT or the 5G RAT of the second SIM.

18. The UE of claim 11, wherein the processor is configured to:
detect the event on the first SIM, wherein the event is a voice call,
register to a network of any technology using the first SIM on the first transceiver based on the event, wherein the UE is registered to the 4G RAT in a dual registration mode with dual radio on the first transceiver and the 5G network on the second SIM on a second transceiver,
determine a high interference with the event on the first transceiver, and
suspend the PDU sessions of the 4G RAT and the 5G RAT associated with second SIM.

19. The UE of claim 11, wherein the processor is configured to:
detect the event on the second SIM when the first SIM_ is connected with the 5G RAT, wherein the event is a voice call,
suspend the data connectivity on the first SIM by sending a registration request with a mobile initiated communication only (MICO) mode on the first SIM to the 5G network, wherein the MICO mode suspends the data connectivity on the first SIM,
initiate the voice call on the second SIM of the UE,
determine that the voice call on the second SIM has ended, and
resume the data connectivity on the first SIM by sending a registration request with a non-MICO mode on the first SIM to the 5G network, wherein the non-MICO mode resumes the data connectivity on the first SIM.

20. The UE of claim 19, wherein the processor is configured to:
enable a dual smart SIM feature to receive the voice call directed towards the first SIM on the second SIM when the data connectivity is suspended on the first SIM.

* * * * *